United States Patent
Williams et al.

(10) Patent No.: US 7,752,236 B2
(45) Date of Patent: Jul. 6, 2010

(54) SYSTEMS AND METHODS OF ENHANCING LEADS

(75) Inventors: Richard Williams, Dana Point, CA (US); Jacob Kong, Irvine, CA (US); Lawrence J. Hughes, Dana Point, CA (US); Damodar Panigrahi, Irvine, CA (US)

(73) Assignee: Experian Marketing Solutions, Inc., Schaumberg, IL (US)

(*) Notice: Subject to any disclaimer, the term of this patent is extended or adjusted under 35 U.S.C. 154(b) by 173 days.

(21) Appl. No.: 11/671,412

(22) Filed: Feb. 5, 2007

(65) Prior Publication Data
US 2008/0109444 A1 May 8, 2008

Related U.S. Application Data

(60) Provisional application No. 60/864,369, filed on Nov. 3, 2006, provisional application No. 60/870,294, filed on Dec. 15, 2006.

(51) Int. Cl.
G06F 7/00 (2006.01)
(52) U.S. Cl. .................. 707/804; 707/722; 707/999.102
(58) Field of Classification Search ............... 707/1–10, 707/102
See application file for complete search history.

(56) References Cited

U.S. PATENT DOCUMENTS

| | | | |
|---|---|---|---|
| 6,868,389 B1 | 3/2005 | Wilkins et al. | |
| 7,043,531 B1 | 5/2006 | Seibel et al. | |
| 2002/0051020 A1* | 5/2002 | Ferrari et al. | 345/854 |
| 2004/0143482 A1 | 7/2004 | Tivey et al. | |
| 2005/0044036 A1 | 2/2005 | Harrington et al. | |
| 2005/0065809 A1 | 3/2005 | Henze | |
| 2005/0080821 A1 | 4/2005 | Breil et al. | |

(Continued)

FOREIGN PATENT DOCUMENTS

WO   WO 2005/036859 A2   4/2005

(Continued)

OTHER PUBLICATIONS

PRWeb Press Release Newswire: Anchor Launches LeadVerifier to Verify, Correct and Enhance Internet Leads, Aug. 8, 2005, 2 pgs.

(Continued)

Primary Examiner—Mohammad Ali
Assistant Examiner—John P Hocker
(74) Attorney, Agent, or Firm—Knobbe, Martens, Olson & Bear, LLP

(57) ABSTRACT

A lead enhancement module transmits to one or more data sources an enhancement list requesting additional data items associated with a lead record. The enhancement list may comprise one or more data bundles, each comprising indicators associated with one or more additional data items. A personalized data bundle may be created by each client listing those specific additional data items that the particular client would like to retrieve for lead records from the client. A default data bundle may be included in the enhancement list for clients that have not defined a personalized data bundle, or the default bundle may be included in the enhancement list in addition to the personalized data bundle. Various default bundles, such as vertical market specific data bundles, may be created and provided to the client for possible inclusion in the enhancement list.

18 Claims, 16 Drawing Sheets

U.S. PATENT DOCUMENTS

| | | | |
|---|---|---|---|
| 2005/0108041 | A1 | 5/2005 | White |
| 2005/0120045 | A1* | 6/2005 | Klawon ..................... 707/102 |
| 2005/0131760 | A1 | 6/2005 | Manning et al. |
| 2005/0234969 | A1* | 10/2005 | Mamou et al. ............. 707/102 |
| 2006/0004731 | A1 | 1/2006 | Seibel et al. |
| 2006/0041500 | A1 | 2/2006 | Diana et al. |
| 2006/0064340 | A1* | 3/2006 | Cook ........................ 705/10 |
| 2006/0106668 | A1 | 5/2006 | Kim et al. |
| 2006/0129422 | A1 | 6/2006 | Kim et al. |
| 2006/0143695 | A1 | 6/2006 | Grynberg |

FOREIGN PATENT DOCUMENTS

| | | | |
|---|---|---|---|
| WO | WO 2008/057853 | A9 | 5/2008 |

OTHER PUBLICATIONS

LeadVerifier: Why Should You Use LeadVerifier?, downloaded from www.leadverifier.com/LeadVerifier_Why.asp, Copyright 2005, 2 pgs.

TARGUSinfo: Lead Verification, Verify Your Leads With Unique Accuracy and Ease, downloaded from www.targusinfo.com/solutions/verify/Default.asp, Copyright 2004-2006.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, 2 pgs.

Web Decisions: the next step in data-driven marketing, 360i eMarketing System, downloaded from www.webdecisions.com, 2 pgs.

Real IQ: Results-Driven Marketing Analytics: LeadMetrix, Lead Generation Companies, Mortgage Industry, downloaded from www.realiq.com/mortgage.html, 4 pgs.

Real IQ: Results-Driven Marketing Analytics: LeadMetrix, downloaded from www.realiq.com/leadmetrix.html, 1 pg.

Service Objects: Insight On Demand, Instant Contact Analysis and Lead Verification Solutions, DOTS Web Services—Product Directory, downloaded from www.serviceobjects.com/products/directory_of_web_services.asp, 4 pgs.

PrimeQ Interactive Advertising, News release: PrimeQ Lead Validation Techniques Gets Stronger, downloaded from www.primeq.com/absolutenm/anmv . . . , 2 pgs.

Service Objects: Insight On Demand, Instant Contact Analysis and Lead Verification Solutions, Products: Real-Time Customer Intelligence for a Nickel, downloaded from www.serviceobjects.com/products/default.asp, 3 pgs.

TARGUSinfo: "Intermark Media Slashes Returned Lead Costs, Improves Affiliate Relations," downloaded from www.targusinfo.com, 4 pgs.

Authenticom: Our Story, "What's In A Name?", downloaded from www.authenticom.com/story.shtml, 1 pg.

Authenticom: Technical Specs—Confidence Level Indicators (CLI), downloaded from www.authenticom.com/confidence_level_indicators.shtml, 2 pgs.

International Search Report and Written Opinion for PCT/US07/83055, Filed Oct. 30, 2007.

International Search Report for PCT/US2007/083055, filed Oct. 30, 2007.

* cited by examiner

PRE-PROCESSING

| | Example 1 | Example 2 |
|---|---|---|
| Received Lead Record | Exemplary Lead Record:<br>Last Name: Brown<br>First Name: Walter<br>Street Address: 1234 Mickey Mouse Lane<br>Zip Code: 84354<br>Telephone: (571) 271-4088<br>Email: Wbb@yahoo.com  *1210A* | Exemplary Lead Record:<br>Last Name: Colon<br>First Name: Marco<br>Street Address: 2234 West 85$^{th}$ Ave<br>Zip Code: 01221<br>Telephone: (212)425-8847<br>Email: colonm@wampu.org  *1210B* |
| Syntax Check | Lead Record Satisfies minimum data requirements<br>Lead Record contains no syntax errors | Lead Record Satisfies minimum data requirements<br>Lead Record contains no syntax errors |
| Spoof Word Check | Possible Spoof Words in Street Address | No Spoof Words located |
| Duplicate Check | Similar name: "Walt Brown" with same email address received from customer within previous 30 days<br>Same email address with different name/phone received from customer 5 times in previous 60 days | No Duplicates found within 90 day reporting period |
| Email Address Validation | Email address syntax is valid<br>Address does exist | Email address syntax is valid<br>Address does exist<br>Address is on Spam list |
| Information Append | Phone Number Appears Incorrect<br>Correct Number is (360)912-2177 | No additional information to append |
| Contactabilty Score | Score = B | Score = A |

Figure 13

Default Bundle golfer code, outdoor code, travel code, investor code, auto owner code, garden code, collector code, cruise code, sports code, mutual code, weight conscious code, buys by phone code, buys by TV code, mailorder multibuyer code, premium credit code, dogs code, cats code, auto code, skiing code, astrology code, boating code, cellphone code, mailorder audio video code, mailorder book code, music classical code, music country code, tennis code, travel domestic code, travel foreign code, volunteer code, lenses code, video code, military active code, military inactive code — 1610

Personalized Data Bundle
(Modified Default Bundle)

golfer code, outdoor code, travel code, investor code, auto owner code, garden code, collector code, cruise code, sports code, ~~mutual code~~, weight conscious code, buys by phone code, buys by TV code, mailorder multibuyer code, premium credit code, dogs code, cats code, auto code, skiing code, ~~astrology code~~, boating code, cellphone code, mailorder audio video code, mailorder book code, music classical code, music country code, tennis code, travel domestic code, travel foreign code, volunteer code, lenses code, video code, ~~military active code, military inactive code~~ — 1620

Personalized Data Bundle

Donor code, pets code, arts code, mailorder buyer code, fitness code, music country code, music classical code — 1630

Figure 16

SYSTEMS AND METHODS OF ENHANCING LEADS

RELATED APPLICATIONS

This application claims priority under 35 U.S.C. §119(e) to U.S. Provisional Application Ser. No. 60/864,369, filed on Nov. 3, 2006, and U.S. Provisional Application Ser. No. 60/870,294, filed Dec. 15, 2006, which are hereby expressly incorporated by reference in their entirety.

BACKGROUND OF THE INVENTION

1. Field of the Invention

This invention relates to systems and methods of enhancing information regarding potential customers.

2. Description of the Related Art

Businesses, or other commercial entities, that sell products and/or services may acquire information regarding potential customers, clients, or business associates from several sources. For example, information regarding a potential customer, client, or business associate, referred to herein as a "lead," may be shared among related businesses. Alternatively, leads may be acquired through marketing efforts by the business, such as radio advertisements, Internet advertising, or seminars, where lists of leads are produced through the marketing efforts. Additionally, leads may be "harvested" from media sources, such as newspapers, magazines, trade journals, websites, and/or message boards, for example. Leads may be acquired in any of these manners, or in other manners, by lead brokers that specialize in compiling leads and selling the leads to other entities. Thus, leads may be acquired from various sources.

The information included in a lead commonly includes contact information regarding the potential customer, such as a telephone number, residential address, and/or email address. However, depending on the source of the lead, this contact information may be incomplete or incorrect, thus making the task of contacting the lead difficult. For example, if a lead does not include a telephone number or includes an incorrect telephone number for the potential customer, the business may need to do further research locating the correct phone number or may not be able to contact the potential customer. If the contact information is missing or incorrect in a lead, the business potentially loses not only costs associated with acquiring the lead, but also costs associated with attempting to contact the lead and/or researching the correct contact information for the lead.

Depending on the source of leads, a lead list may comprise one or more leads that include information that does not accurately correspond with the potential customer. For example, businesses or lead brokers may acquire leads through marketing efforts wherein a potential customer provides contact information in exchange for free or discounted products or services, for example. However, potential customers often realize that by providing their contact information, there is a possibility that later communications from the business, lead broker, or other entity to which the contact information is sold, may be received. Accordingly, if a potential customer does not want to risk any subsequent contacts, the potential customer may provide a false name, address, and/or other contact information to the business or lead broker. Alternatively, the potential customer may not provide any telephone, address, and/or other contact information. Accordingly, leads comprising this missing and/or inaccurate information do not provide the business using the lead with information that allows them to contact the potential customer and, thus, are of little or no value to the business.

Businesses that make use of leads often receive new leads periodically, such as daily, weekly, or monthly, and attempt to contact the leads to convert the potential customers to customers. For example, a business may have a weekly seminar regarding products and services that may be marketed to potential customers, where the potential customers attending the seminar are asked to provide a name and contact information to the business. Thus, after each seminar, the business has a new lead list comprising information regarding multiple potential customers. However, there is a possibility that the same potential customers attend multiple of these seminars and, thus, is listed on multiple lead lists. Similarly, if a business purchases leads from one or more lead brokers, there is a possibility that the same lead is listed on two or more lead lists, or even multiple times on a single lead list. Thus, the business may unknowingly contact a potential customer multiple times, reducing human resources that are available for non-duplicate leads.

SUMMARY

In one embodiment, a method of enhancing a lead record comprises receiving a lead record from a client, the lead record comprising information regarding an individual, determining a default data bundle associated with the lead record based at least partly on a vertical business market of the client, the default data bundle indicating one or more additional data items associated with the lead record that are to be retrieved from one or more data sources, transmitting the default data bundle to the one or more data sources, receiving from the one or more data sources at least some of the additional data items indicated in the default data bundle, generating an enhanced lead record comprising at least a portion of the lead record received from the client and at least a portion of the additional data items received from the one or more data sources, and transmitting the enhanced lead record to the client.

In another embodiment, a method of enhancing a lead record comprises receiving a lead record comprising information regarding an individual, determining, based at least partly on one or more attributes associated with the lead record, one or more additional data item indicators to include on an enhancement list, the enhancement list being configured for transmission to one or more data sources, receiving from the one or more data sources at least some of the additional data items corresponding to the indicators on the enhancement list, and transmitting at least a portion of the additional data items to a requesting entity.

In another embodiment, a computerized system for retrieving additional data items related to a received lead record in order to enhance an enhanced lead record that is returned to a requesting entity comprises a data source comprising one or more additional data items associated with each of a plurality of individuals, the data source in data communication with a network and a computing device comprising a processing unit, a storage device, and an input/output interface in data communication with the network and configured to receive a lead record from the requesting entity. In one embodiment, the system further comprises an output bundling module configured to determine one or more additional data items to be requested from the data source, based at least partly on one or more attributes associated with the lead record, and to transmit a request for the determined additional data items to the data source via the input/output interface, the output bundling module further configured to receive one or more of the requested additional data items from the data source and to generate an enhanced lead record comprising at least some of the additional data items.

In one embodiment, a system of enhancing a lead record comprises means for receiving a lead record comprising information regarding an individual, means for determining, based at least partly a vertical business market associated with a source of the lead record, indicators of one or more additional data items to include on an enhancement list, the enhancement list being configured for transmission to one or more data sources, means for receiving from the one or more data sources at least some of the additional data items corresponding to the indicators on the enhancement list, and means for transmitting at least a portion of the additional data items to the source of the lead record.

BRIEF DESCRIPTION OF THE DRAWINGS

FIG. 13 illustrates certain data items of two exemplary lead records, as well as the results of certain lead enhancement processes performed using data items of the exemplary lead records.

FIG. 16 illustrates one embodiment of three exemplary data bundles that may be included in an enhancement list, or that may be separated included on different enhancement lists.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
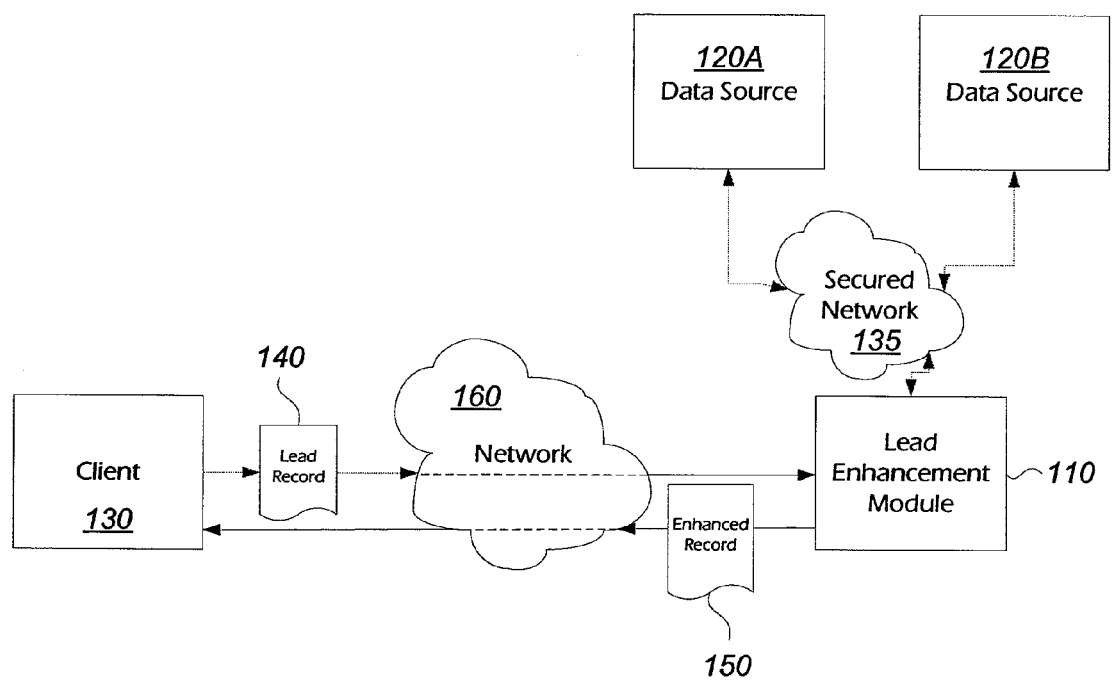
FIG. 1 is a block diagram illustrating one embodiment of an enhancement module in communication with a network and various networked devices.

FIG. 1 is a block diagram illustrating one embodiment of a lead enhancement module 110 in communication with a network 160 and various networked devices. In one embodiment, the lead enhancement module 110, or simply the "enhancement module 110," comprises a computing device configured to perform one or more verification, validation and/or enhancement operations on a lead, which is also referred to herein as a "lead record". In general, a lead record may be in either paper format, such as information regarding a potential customer printed on a piece of paper, or in an electronic format, such as a record in a database that may be stored, manipulated, transferred, and viewed.

In one embodiment, the enhancement module 110 is configured to verify that a received lead is properly formatted, generate a contactability score for the lead, append additional information to the lead record, including information obtained from one or more statistical models regarding a consumer that is associated with the lead record, and/or other lead verification, validation, and enhancement processes that are described in detail below. As used herein, the term "enhance," "enhancement," and "lead enhancement" refer generally to any combination of one or more of the above-noted verifications, validations, and enhancement processes, in addition to any other processes that are described herein for providing additional information regarding a lead record, for example.

In the exemplary embodiment of FIG. 1, the enhancement module 110 is in communication with data sources 120A, 120B via a secured network 135, such as a local area network. In other embodiments, the data sources 120 may communicate with the enhancement module 110 via the network 160, rather than, or in addition to, the secured network 135. In one embodiment, the enhancement module 110 communicates with the data sources 120 via an unsecured network using a secured data protocol, such as data encryption, for the data transmitted on the unsecured network. Similarly, in one embodiment the enhancement module 110 may communicate with the client 130 using encrypted data sent across an unsecured network, such as network 160, for example. The data sources 120 may comprise any number of data repositories storing information regarding individuals, such as financial, credit, and biographical data. In one embodiment, certain of the data sources 120 may also be configured to apply models to received lead data.

As shown in FIG. 1, a client 130 communicates a lead record 140 to the enhancement module 110 via the network 160. In one embodiment, the lead record 140 comprises a plurality of fields, wherein at least some of the fields include associated data items. For example, an exemplary lead record may include a surname field, first name field, address field, and telephone number field, wherein each of the fields included a corresponding data item. In other embodiments, the lead record may comprise one or more of the following fields: client vertical type, first name, middle initial, last name, phone1, phone type, phone2, phone 2 type, phone 3, phone 2 type, address type, address1, unit1, city1, state1, ZIP1, address type, address2, unit1, city2, state2, ZIP2, degree, program, time to call, age, veteran status, high school diploma/GED, opt-in status, interest, and start date.

In one embodiment, the client 130 comprises any entity, whether commercial or non-profit, that transmits leads to the lead enhancement module 110. For example, many commercial entities purchase or otherwise acquire leads for potential customers that may be interested in the products or services offered by the commercial entity. However, prior to contacting each of the leads, the commercial entity may desire to have the lead records enhanced in order to reduce costs associated with contacting the leads and prioritize an order to contact the leads, for example. Accordingly, a client 130 may transmit one or more lead records to the lead enhancement module 110, which in turn enhances the received lead records and returns an enhanced lead record 150 to the customer. Thus, after receiving the lead record 140, the enhancement module 110 performs one or more enhancements on the lead data. In one embodiment, the client 130 specifies which of a plurality of enhancements should be applied to lead records received from the particular client 130. Additionally, the client 130 may specify parameters for certain of the enhancements that are to be applied to the lead record. Thus, the customer may be given a wide range of flexibility as to data that the client 130 would like to have in an enhanced lead record 150. In one embodiment, the lead enhancement module 110 enhances leads such that targeted marketing using the leads may improve conversion rates for the client 130. In one embodiment, the enhanced lead record 150 comprises data associated with one more of the following fields: contactability score (see FIGS. 10A, 10B, and 11, for example); standardized address of lead record 140; phone append (see FIGS. 9A and 90B, for example); address append (see FIGS. 9A and 90B, for example); syntax check failure and/or syntax message (see FIGS. 5A and 5B, for example); spoof check failure and/or spoof check message (see FIGS. 8A and 8B, for example); de-duplication failure and/or de-duplication message (see FIGS. 6A and 6B, for example); email validation warning flag, email warning message—invalid vs. spam list, do not call flag, do not call message (see FIG. 4, for example); and/or the original lead 140.

In one embodiment, the client 130 pays the operator of the lead enhancement module 110, referred to herein as the "lead enhancement provider," based on the number of lead records that are enhanced. Additionally, this per lead record cost may be based on which of the enhancement processes are performed on the received lead records, the number of lead data fields that are enhanced, and/or the parameters for those enhancement processes. In other embodiments, the client 130 may pay a flat fee to the lead enhancement provider, such as on a weekly, monthly, or yearly basis. In another embodiment, the client has a revenue sharing arrangement with the lead enhancement provider, such that the compensation provided to the lead enhancement provider is proportional to the value of the enhanced leads to the client 130. For example, a percentage of a fee paid to the client 130, or a flat fee, may be paid to the lead enhancement provider for each enhanced lead that results in conversion of a potential customer to an actual customer of the client 130.

Figure 2:
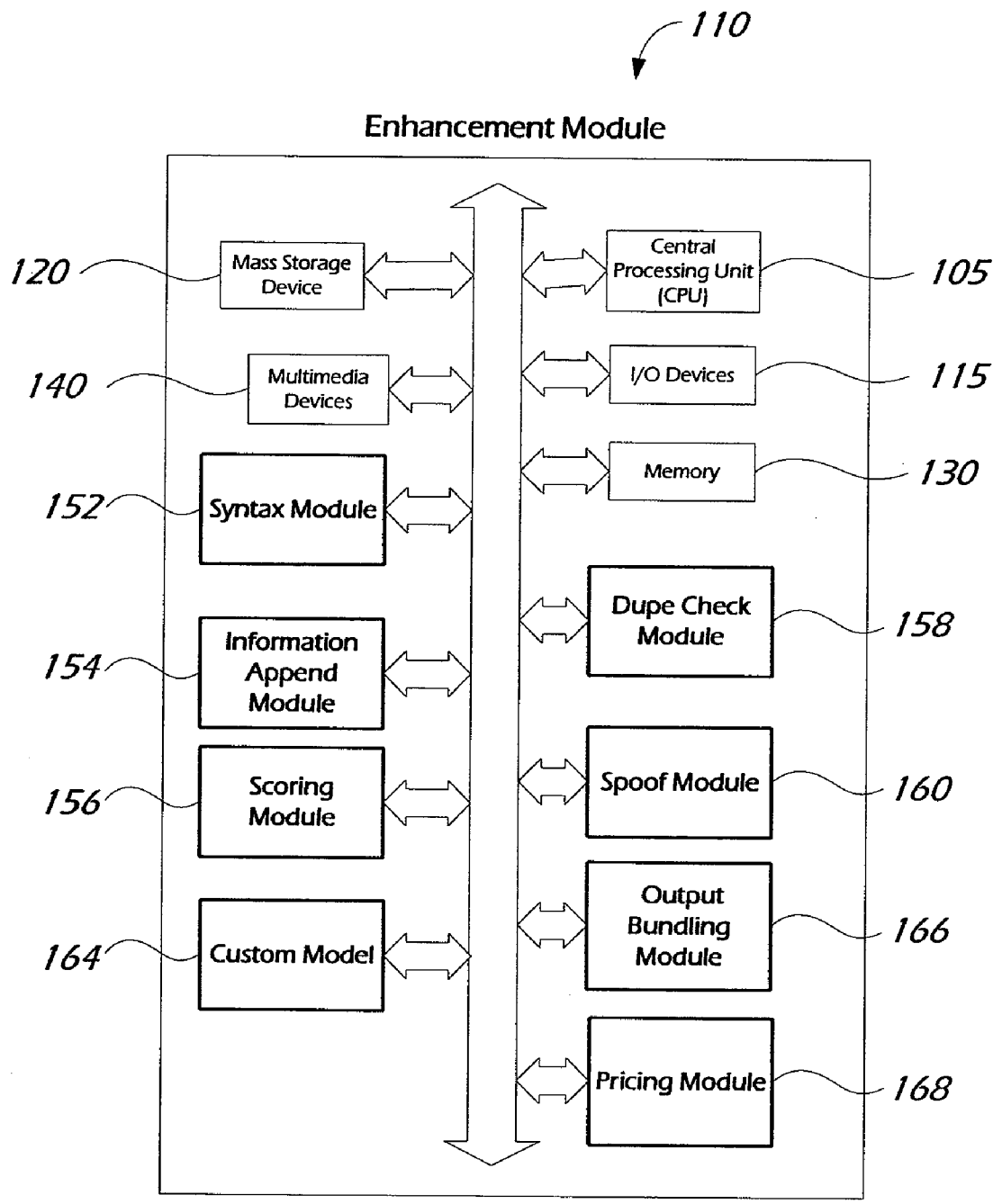
FIG. 2 is a block diagram of the enhancement module of FIG. 1 including several modules of the exemplary validation device.

FIG. 2 is one embodiment of a block diagram of the enhancement module 110 of FIG. 1. As noted above, the enhancement module 110 may be used to implement certain systems and methods described herein. For example, in one embodiment the enhancement module 110 may be configured to receive lead records from clients of the lead enhancement provider, enhance the lead records, and return enhanced lead records to the clients. The functionality provided for in the components and modules of the enhancement module 110 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, the enhancement module 110 comprises a server based system. In other embodiments, the enhancement module 110 may comprise any other computing device, such as, for example, a computing device or server that is IBM, Macintosh, or Linux/Unix compatible. In another embodiment, the enhancement module 110 comprises any other suitable computing device. In one embodiment, the exemplary enhancement module 110 includes one or more central processing units ("CPU") 105, which may each include conventional microprocessors or any other processing unit. The enhancement module 110 further includes one or more memory devices, such as random access memory ("RAM") for temporary storage of information and a read only memory ("ROM") for permanent storage of information, and one or more mass storage devices 120, such as hard drives, diskettes, or optical media storage devices. In one embodiment, the modules of the enhancement module 110 are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the enhancement module 110 communicate via one or more networks, such as a local area network that may be secured.

The enhancement module 110 is generally controlled and coordinated by operating system software, such as server based software. In other embodiments, the enhancement module 110 comprises modules that execute one or more other operating systems, such as Windows NT, Windows 2000, Windows XP, Windows Vista, Linux, SunOS, Solaris, or any other suitable desktop or server operating systems. In Macintosh systems, the operating system may be any available operating system, such as MAC OS X. In other embodiments, the enhancement module 110 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary enhancement module 110 includes one or more commonly available input/output (I/O) devices and interfaces 115, such as a keyboard, mouse, touchpad, speaker, and printer. In one embodiment, the I/O devices and interfaces 115 include one or more display device, such as a monitor, that allows the visual presentation of data to a user. More particularly, a display device provides for the presentation of GUIs, application software data, and multimedia presentations, for example. The enhancement module 110 may also include one or more multimedia devices 140, such as speakers, video cards, graphics accelerators, and microphones, for example.

In the embodiment of FIG. 2, the I/O devices and interfaces 115 provide a communication interface to various external devices. In the embodiment of FIG. 1, the enhancement module 110 is in communication with a network 160, which comprises any combination of one or more LANs, WANs, or the Internet, for example, via a wired, wireless, or combination of wired and wireless, communication links. As noted with reference to FIG. 1, the network 160 communicates with various computing devices and/or other electronic devices via wired or wireless communication links.

In the embodiment of FIG. 2, the enhancement module 110 also includes application modules that may be executed by the CPU 105. More particularly, one embodiment of the application modules include a syntax module 152, an information append module 154, a scoring module 156, a dupe-check module 158, a spoof module 160, a custom model module 164, an output bundling module 166, and a pricing module 168, which are discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In general, each of the modules 152, 154, 156, 158, 160, 164, 166, and 168 are configured to enhance lead records that are received by the lead enhancement module 110. Each of these modules is described in further detail below with reference to the figures. In other embodiments, additional or fewer modules may be used in order to provide additional or fewer lead enhancement features. As noted above, a business or other entity, such as client 130 of FIG. 1 may select one or more enhancements for lead records that are transmitted to the lead enhancement module 110, and accordingly, the lead record may be processed by one or more of the modules of FIG. 2.

Stage I Lead Enhancement

In one embodiment, the enhancement module 110 performs multiple stages of enhancing received lead records. In general, a first stage of lead enhancement may comprise one or more lead validation and verification processes, such as may be performed by the syntax module 152, information append module 154, scoring module 156, dupe-check module 158, and spoof module 160, for example. A second stage of lead enhancement may comprise one or more enhancement processes, such as those performed by information append module 154 and output bundling module 166, for example. A third stage of lead enhancement may comprise custom enhancements for lead records, such as application of custom models to lead records that may be performed by custom model module 164.

A. Lead Enhancement Method

Figure 3:
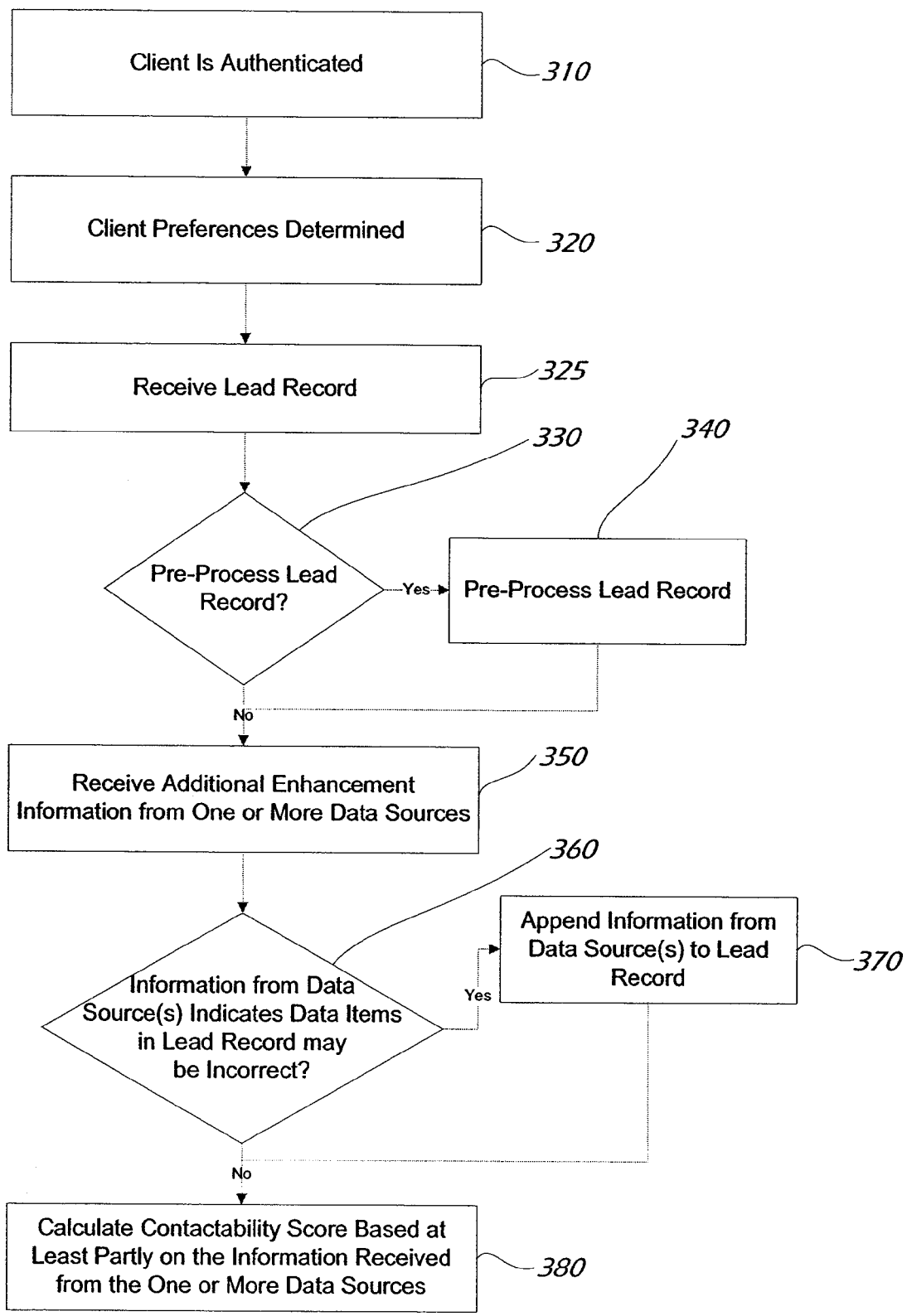
FIG. 3 is a flowchart illustrating one embodiment of a first stage of a lead enhancement method.

FIG. 3 is a flowchart illustrating one embodiment of a first stage of a lead enhancement method that may be performed by the enhancement module 110, or by other devices. For example, in one embodiment certain blocks of FIG. 3 may be performed by one or more of the data sources 120. More particularly, in one embodiment a process of appending additional data to a lead record, such as the method of blocks 350, 360, and 370 may be performed by one or more of the data sources 120. Depending on the embodiment, certain of the blocks described below may be removed, others may be added, and the sequence of the blocks may be altered.

Beginning in a block 310, a customer of the lead enhancement provider, such as client 130 of FIG. 1, is authenticated by the lead enhancement module 110. In one embodiment, information that may be used to authenticate the client 130 is included with a lead record sent by the client 130 (Block 325), or is transmitted from the client 130 prior to transmitting a lead record to the enhancement module 110. Various authentication methods are known in the art, any of which are usable in the authentication block 310 of FIG. 3.

In certain embodiments, the client 130 comprises multiple entities, such as a central entity, e.g., a parent corporation, and multiple subsidiaries of the central entity, where each of the entities may have separate lead records for enhancement. In this embodiment, the lead records from any of the client entities may be transmitted from either the individual entities or directly from the parent entity and processed by the enhancement module 110. In either case, each of the client entities may be associated with different business rules for enhancing lead records from the entities, such as rules for selecting preprocessing methods, selecting data bundles to append, and/or generation and selection of custom models, among others. Thus, in one embodiment a single client 130 may be associated with multiple sets of business rules, including client preferences, that correspond with respective entities of the client 130. In one embodiment, client entities comprise affiliates, subsidiaries, or partners of a central entity. In other embodiments, the client 130 may serve as an agent or broker for customers of the client 130, whereby lead records for customers of the client 130 are transmitted to the lead enhancement module either from the client 130 on behalf of one or more customers of the client, or directly from customers of the client 130. The lead records received by such a broker client may be associated with different business rules, including client preferences, for enhancing the lead records based on the particular customer, or customers, of the client 130 for which the enhanced leads are generated.

In other embodiments, the lead enhancement module 110 may host a web interface on an Internet-accessible server, such that the client 130 may access the enhancement processes of the lead enhancement module 110 via a web interface. Alternatively, the client 130 may execute application software, such as custom-built client software or third-party software that has been configured to interface with the lead enhancement module 110. In either embodiment, the client 130 provides authentication information to the lead enhancement module 110 prior to any enhancements being performed by the lead enhancement module 110. As noted above, in some embodiments, the authentication process is automated, such that the client 130 is not required to enter any information, but instead the client 130 is identified by its IP address, for example.

Continuing to a block 320, client preferences for lead enhancement are determined. In one embodiment, when a client establishes an account with the lead enhancement provider, such as via a Web interface, the client preferences are entered and stored by the lead enhancement module 110. In this embodiment, when the client 130 later logs into the lead enhancement module 110, the preferences are accessed and referred to during one or more lead enhancement processes. In another embodiment, the client 130 may select lead enhancement preferences in conjunction with transmitting lead records to the lead enhancement module 110. In one embodiment, a default preference set is used for any client that has not selected alternative preferences. The preferences may indicate one or more of the enhancement processes to be performed on leads received from the client. For example, a first client may desire only to have lead records analyzed for syntax errors, such as by the syntax module 152, while a second client may desire to have a contactability score generated for each lead record, such as may be performed by the scoring module 156.

Moving to a block 325, a lead record is received at the lead enhancement module 110. As illustrated in FIG. 1, for example, the client 130 transmits the lead record 140 to lead enhancement module 110 via the network 160. In one embodiment, the lead record 140 is in a comma separated value (CSV) format, such as the formats that are usable by spreadsheet applications. In another embodiment, the lead record 140 is in a XML format. In one embodiment, the lead record 140 is received via HTTP or HTTPS or via a web service, such as SOAP. For example, in one embodiment the lead record 140 comprises a plurality of HTML Name Value pairs. In other embodiments, such as embodiments where multiple lead records are transmitted to the enhancement module 110 for batch processing, the lead list may be transmitted via FTP, for example. In another embodiment, the lead record 140 is in the body of an email. The lead record 140 may be stored in any other suitable format for storing data items. Additionally, the lead record 140 may be included in a file, such as a CSV file, for example, that comprises a plurality of lead records.

Moving to a block 330, the lead enhancement module 110 determines if one or more preprocessing methods should be performed on the received lead record. In one embodiment, client preferences stored by the lead enhancement module 110, or received with the lead record 140, determine whether preprocessing is performed on the received lead record 140. As described further with regard to FIG. 4, in one embodiment the preprocessing methods include a syntax check, a spoof word check, a duplicate check, and an email address validation. In other embodiments, the preprocessing may comprise fewer and/or additional methods. If the client preferences and/or the default preferences provide for any preprocessing of the received lead record, the method continues to a block 340. If no preprocessing of the lead record is desired, the method continues to a block 350.

Figure 4:
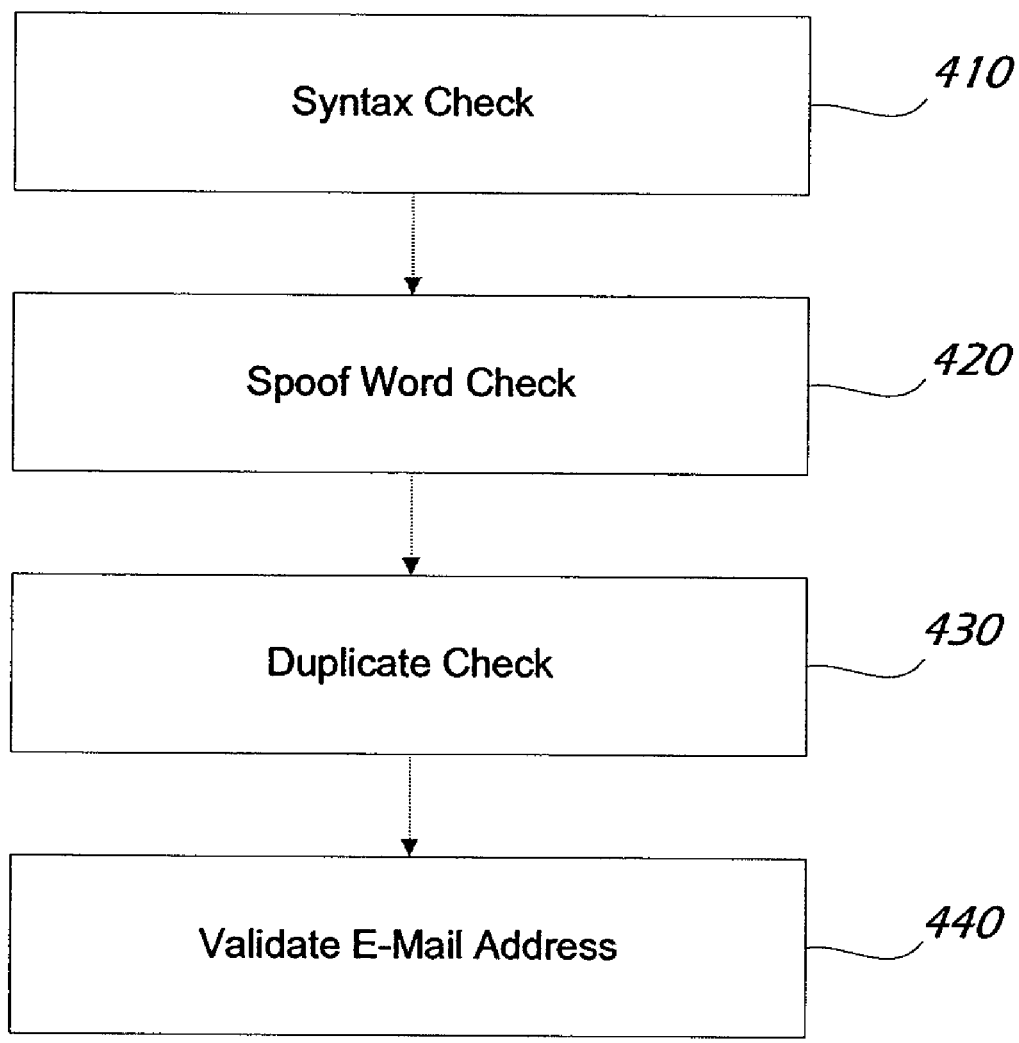
FIG. 4 is a flowchart illustrating one embodiment of a preprocessing method that may be performed as part of the first stage.
Figure 5A:
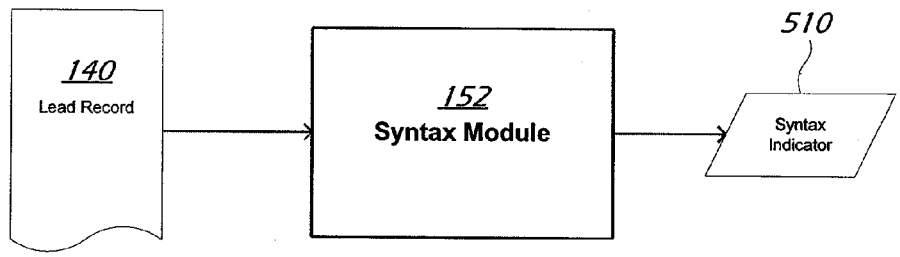
FIG. 5A is a block diagram illustrating a syntax module receiving information regarding a lead record and outputting one or more indicators regarding the lead record.
Figure 5B:
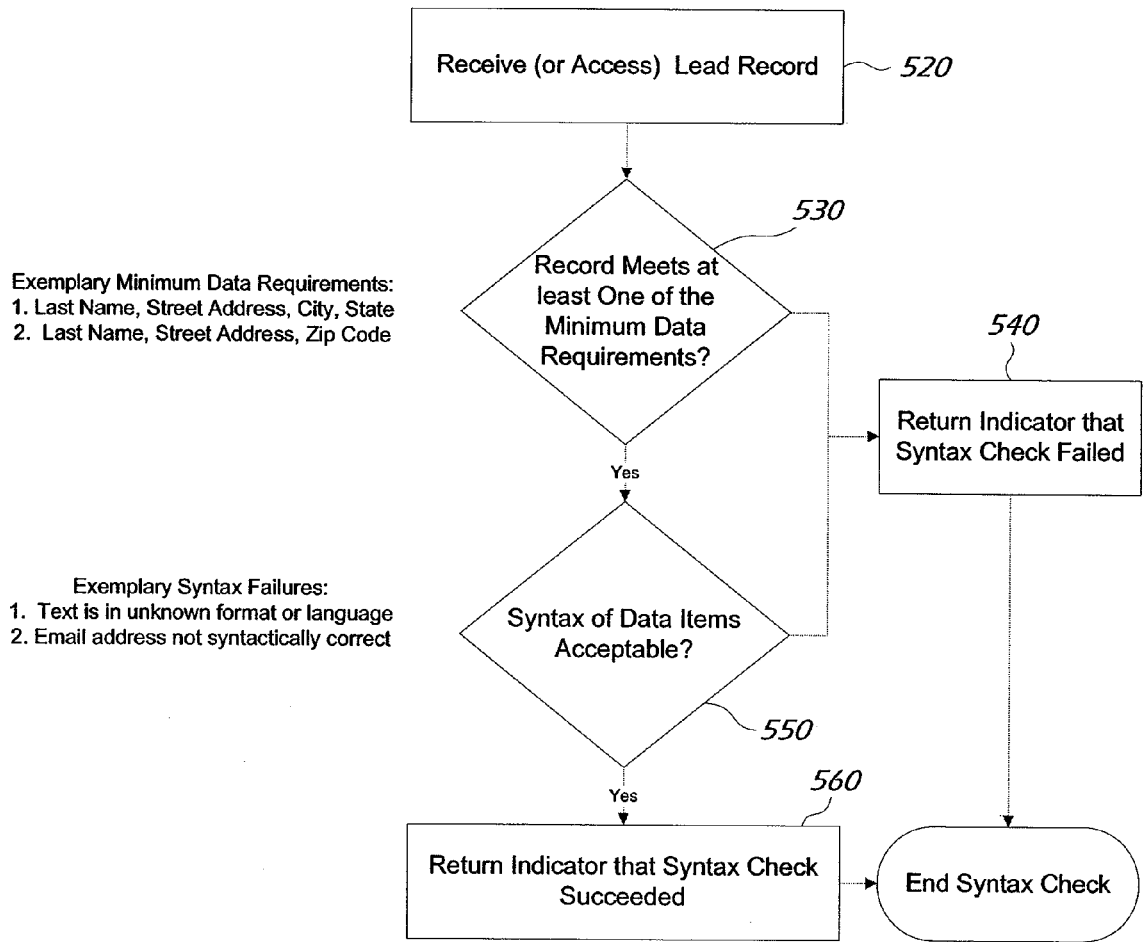
FIG. 5B is a flowchart illustrating one embodiment of a method that may be performed by the syntax module.
Figure 8A:
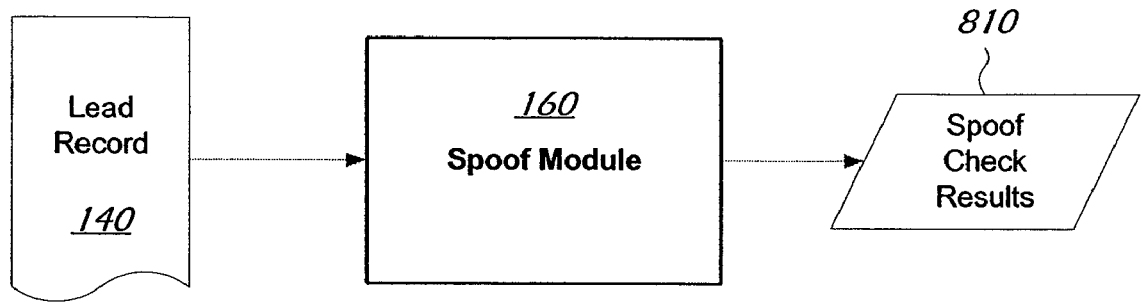
FIG. 8A is a block diagram illustrating a spoof module receiving information regarding a lead record and outputting one or more indicators regarding the lead record.
Figure 8B:
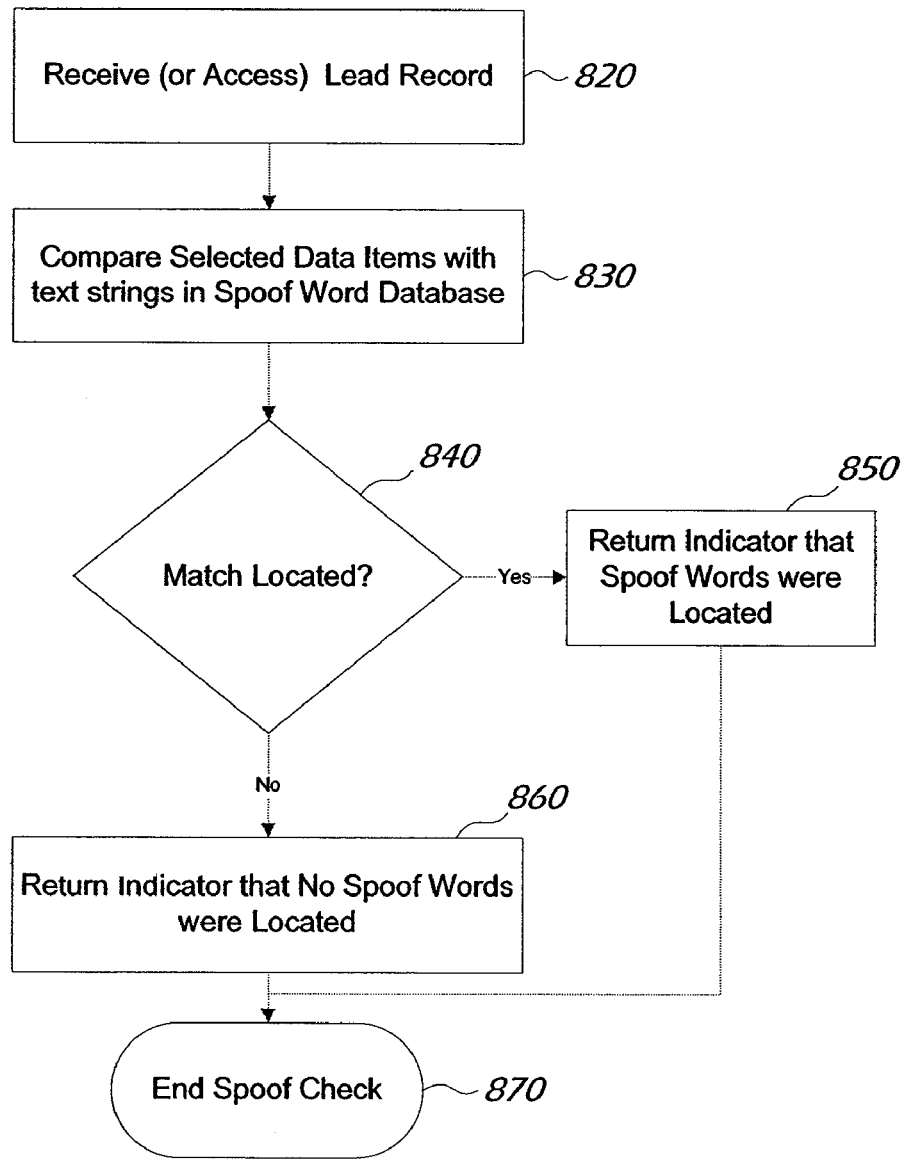
FIG. 8B is a flowchart illustrating one embodiment of a method that may be performed by the spoof module.

In a block 340, the lead record is preprocessed by executing one or more methods on the received lead record. FIG. 4 illustrates an exemplary preprocessing method that may be applied to a received lead record 140 in the preprocessing block 340. In one embodiment, depending on the results of the preprocessing block 340, the method may abort prior to performing any further enhancements to the lead record 140 and return an indication of the reasons for aborting the enhancement. For example, if the syntax module 152 determines that the lead record does not include valid data items in a minimum set of fields, the preprocessing in block 340 and the remaining lead enhancement processes may be aborted. FIGS. 5A-5B provide further details regarding the syntax module 152. Likewise, if the spoof module 160 determines that the lead record 140 includes spoof words, such as vulgar words, in the surname and/or first name data fields, for example, the preprocessing in block 340 and the remaining lead enhancement processes may be aborted. FIGS. 8A-8B provide further details regarding the spoof module 152.

Next, in a block 350, additional enhancement information is received from one or more data sources. In one embodiment, the data sources are external to the enhancement module 110, such as the data sources 120A, 120B of FIG. 1, or other data sources that may be in communication with the lead enhancement module 110 via the network 160. Alternatively, the data sources may be local to the enhancement module 110. The information received from the data sources may comprise data associated with certain data items of the received lead record. For example, in one embodiment the data source 120A may provide an email address and/or phone number for the lead, based upon a received surname, first name, and address of the lead. In one embodiment, blocks 350, 360, and 370 are performed by one or more of the data sources 120, such that the data source 120 receives, or determines, additional enhancement information that may be included in the enhanced lead record.

Continuing to a block 360, the information received from the one or more data sources is compared to data items in the lead record. For example, a telephone number received from a data source may be compared to a telephone number in the original lead record 140. If the two telephone numbers are different, the method proceeds to a block 370 where additional information from the one or more data sources is appended to the lead record. In another embodiment, the telephone number and/or email address in the lead record 140 are transmitted to the one or more data sources. In this embodiment, if the data source locates an alternative or more likely telephone number and/or email address than those supplied in the lead record 140, the data source may return the alternative telephone number and/or email address. In one embodiment, the data source also returns an indication as to a correlation between the telephone number and other data items in the lead record 140, as located in the data source. This information regarding a relationship between the various data items of the lead record may be used in generating a contactability score for the lead, such as is described with reference to FIGS. 10A and 10B, for example. In one embodiment, block 360 performs more detailed analysis of additional information that is located by the one or more data sources in order to determine which additional information should be included in the enhanced lead record. For example, in one embodiment each additional information item is analyzed to determine a confidence level that the information item is associated with the individual identified in the received lead record. In this embodiment, if the information item exceeds a threshold confidence level, the information item may be included in the enhanced lead record. In one embodiment, the client 130 indicates a maximum number of alternative information items to be returned in the enhanced lead record. If the information received from the one or more data sources does not indicate that the lead record includes old or invalid information, the method continues to a block 380

Figure 9A:
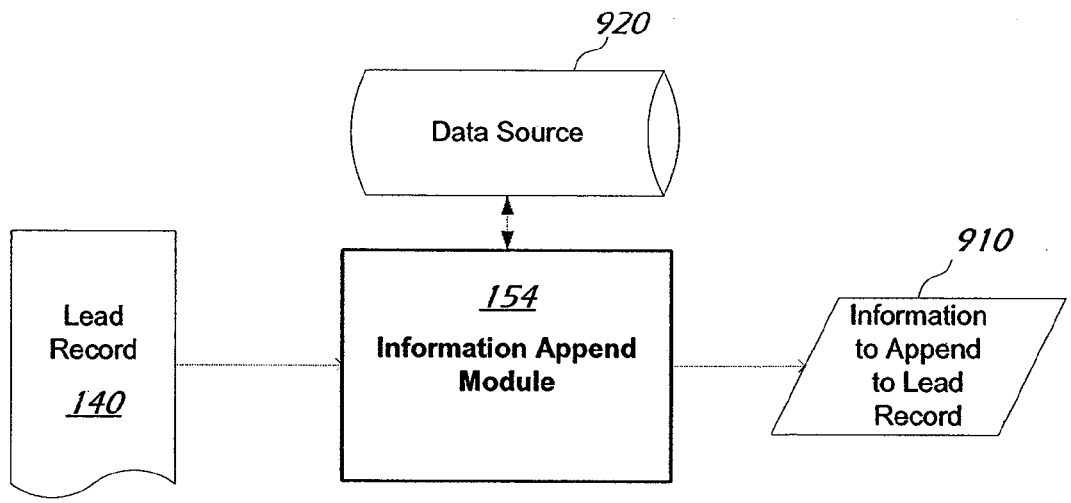
FIG. 9A is a block diagram illustrating an information append module receiving information regarding a lead record and outputting one or more indicators regarding the lead record.
Figure 9B:
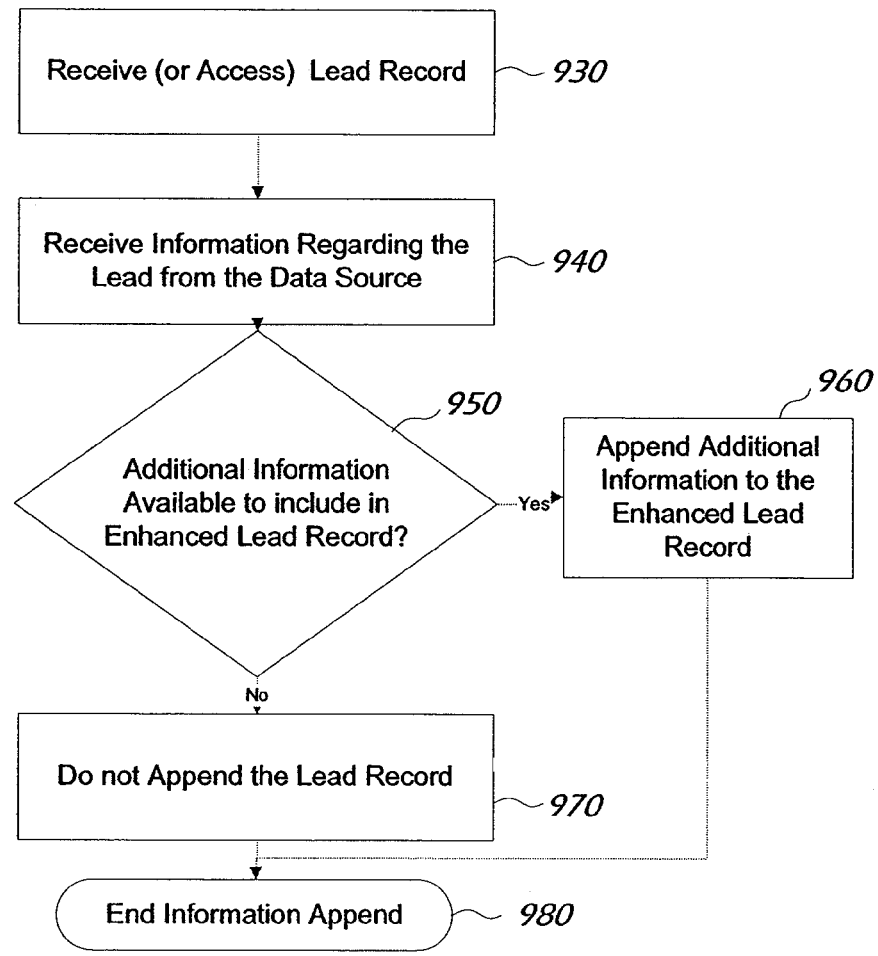
FIG. 9B is a flowchart illustrating one embodiment of a method that may be performed by the information append module.

In a block 370, information from the one or more data sources is appended to the lead record. For example, if the phone number received from a data source does not match a telephone number in the lead record, the telephone number from the data source may be appended to the lead record, in order to increase the likelihood that the potential customer associated with the lead can be contacted. In one embodiment, multiple telephone numbers, or other information items, may be returned to the client in the enhanced lead record. Likewise, if other data items are inconsistent between the lead record and information received from the data sources, other fields of the lead record may be appended with additional information. FIGS. 9A-9B illustrate one embodiment of a process of appending information to a lead record, such as may be performed by the information append module 154 of FIG. 2, or in other embodiments by another device, such as one or more of the data sources 120.

In one embodiment, rather than appending information to the lead record 140, an enhanced lead record, which may include a copy of the lead record 140, as well as any information for appending to the lead record 140, is generated. Thus, any reference herein to appending the lead record 140 should be construed to include both modifying the lead record 140 in order to form an enhanced lead record and adding the information to be appended to an enhanced lead record.

Figure 10A:
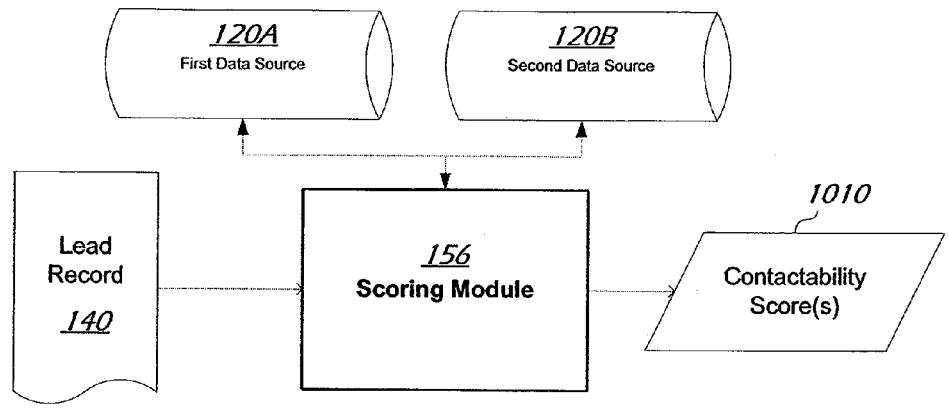
FIG. 10A is a block diagram illustrating the scoring module receiving information regarding a lead record and outputting a contactability score for the lead record.
Figure 10B:
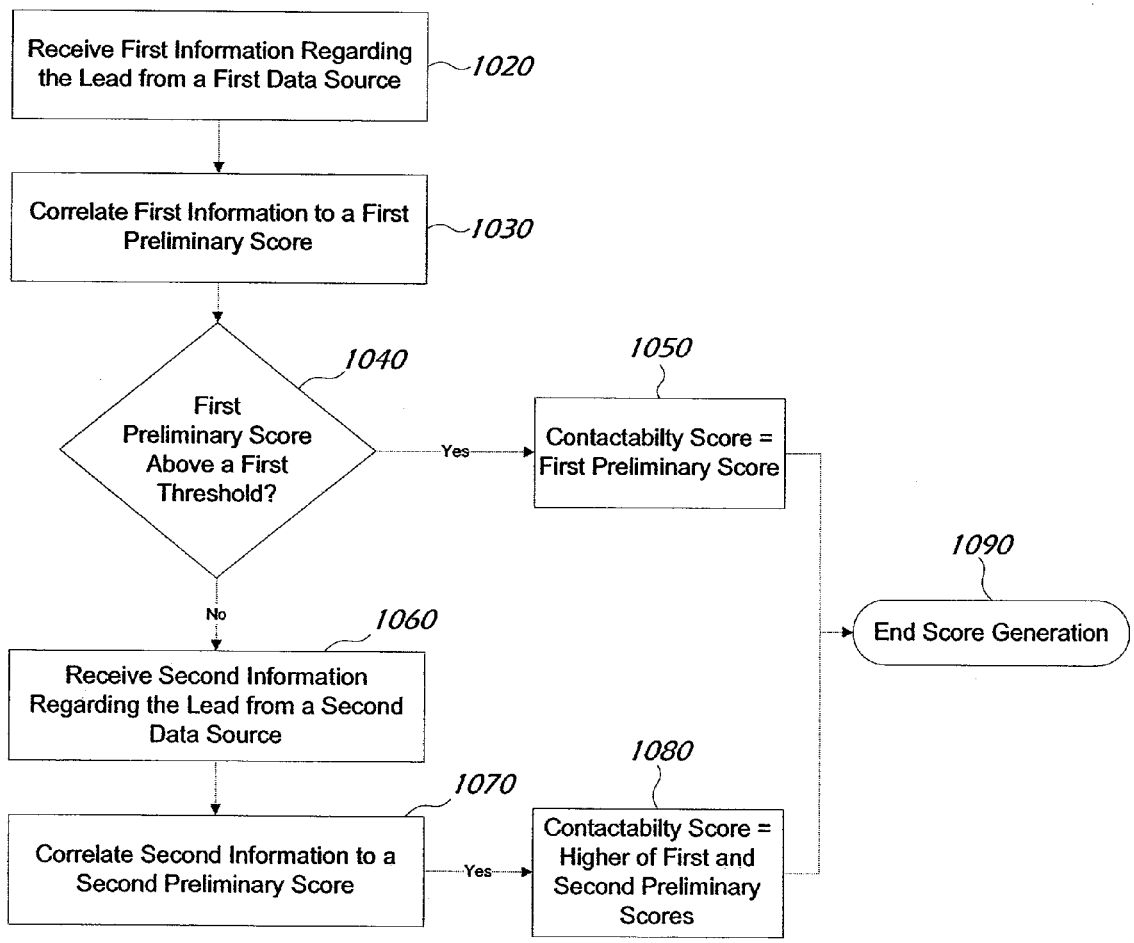
FIG. 10B is a flowchart illustrating one embodiment of a method that may be performed by the scoring module.

In a block 380, a contactability score for the received lead record is calculated, based at least partly on the information received from the one or more data sources. For example, an academic score such as A, B, C, D, E, or F may be assigned to the lead record, where the score is indicative of a likelihood that the client 130, or other entity, will reach the potential customer indicated in the lead record 140 using the contact information in the enhanced lead record 150, such as a telephone number included in the enhanced lead record. In other embodiments, other scoring methodologies are possible, such as scores that correspond with credit score ranges, such as in the range of 350-950, for example, where lower scores indicate lower probabilities that the potential customer may be reached using the contact information received in the lead record 140 and/or the contact information in the enhanced lead record 150. In other embodiments, a contactability score may be associated with other contact information associated with the lead record, such as each phone number, email address, and physical address, for example, that is returned in the enhanced lead record 150. The contactability score advantageously provides an indicator of the degree of probability that the lead may be contacted using the contact information, such as the telephone number, in the lead record or received from a data source 120. For example, contactability scores may allow the client 130 to distinguish between those leads that are likely to be easily contacted and those leads that are not likely to be contactable in determining lead priorities. FIGS. 10A and 10B illustrate one embodiment of a method of determining a contactability score for a lead based upon information received from at least one data source.

Depending on the embodiment, the enhanced lead record 150 may be returned only to the client 130, to multiple client entities, and/or to other related entities. For example, in one embodiment a client 130 that comprises multiple entities may request that enhanced lead records (corresponding to one or more lead records that are transmitted to the enhancement module 110) are separately forwarded to multiple of the client entities, possibly comprising different portions of the enhanced lead records and in different mediums. Similarly, the client 130 may request that the enhanced lead records, or portions of the enhanced lead records, are transmitted to customers of the client or other entities with which the client 130 has a business relationship. The distribution of enhanced lead records may be controlled by default rules for each client 130 or may be controlled by rules received from a client 130 for a particular lead record or batch of lead records. In one embodiment, the above-noted enhanced lead record distribution features are available for enhanced lead records that are enhanced by Stage I, Stage II, and/or Stage III enhancements.

B. Preprocessing

FIG. 4 is a flowchart illustrating one embodiment of a preprocessing method that may be performed in block 340 of FIG. 3, for example. As noted above, a client may select one or more of the preprocessing methods illustrated in FIG. 4 to perform using the data in transmitted lead records. Alternatively, the client may not want any of the preprocessing methods of FIG. 4 performed on transmitted lead records. In other embodiments, the preprocessing method comprises fewer or additional methods that may be performed upon lead records. In one embodiment, the preprocessing method of FIG. 4 also standardizes the lead record received from the client 130, such as by converting the address and ZIP code into commonly used formats.

Beginning in a block 410, certain fields of the lead record are checked to determine if minimum requirements for those fields are satisfied and/or if the data included in those fields meets predefined syntax requirements. In one embodiment, the client 130 provides particular syntax requirements that should be checked in the syntax check block 410. Alternatively, default syntax requirements are applied on the lead record 140. FIGS. 5A-5B illustrate one embodiment of a process that may be performed by the syntax module 152 of FIG. 2 in performing the syntax check block 410. In one embodiment, the syntax check block 410 determines if at least a last name field, street address field, City field, and state field of the received lead record 140 comprise usable data. Additionally, in one embodiment the syntax check block 410 determines if the text in the data fields comprise information that is in known and usable formats and languages.

Continuing to a block 420, a spoof word check is performed on certain data items of the lead record 140. In general, the spoof word check determines whether data items in the lead record 140 include spoof words, such as those that might be received from an individual that does not want to be contacted by third parties. For example, the client 130 may receive leads from one of many sources, such as lead brokers or through customer databases of related companies. However, certain of the leads may include information that does not accurately correspond with the individual that originally provided the information. For example, the client 130 may receive a lead from a lead broker that includes a first name of Mickey and a last name of Mouse. Because the name on the lead includes spoof words, defined herein as words that do not accurately describe the individual providing the information, the remainder of the information in the lead is likely inaccurate also. Accordingly, in block 420, a spoof word check process is performed on the lead record 140 in order to provide the client 130 with an indication as to the likelihood that the lead record 140 includes one or more spoof data items, and possibly to indicate whether any field of the lead record 140 include usable information. FIGS. 8A-8B illustrate one embodiment of an apparatus and process for performing a spoof word check, such as by the spoof module 160 of FIG. 2.

Figure 6A:
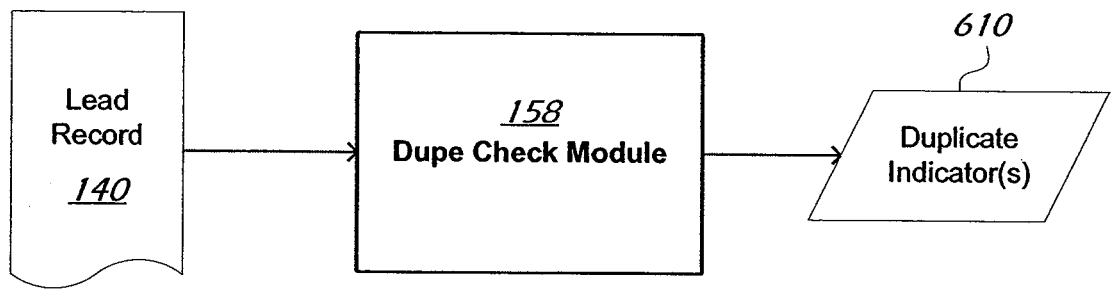
FIG. 6A is a block diagram illustrating a dupe-check module receiving information regarding a lead record and outputting one or more indicators regarding the lead record.
Figure 6B:
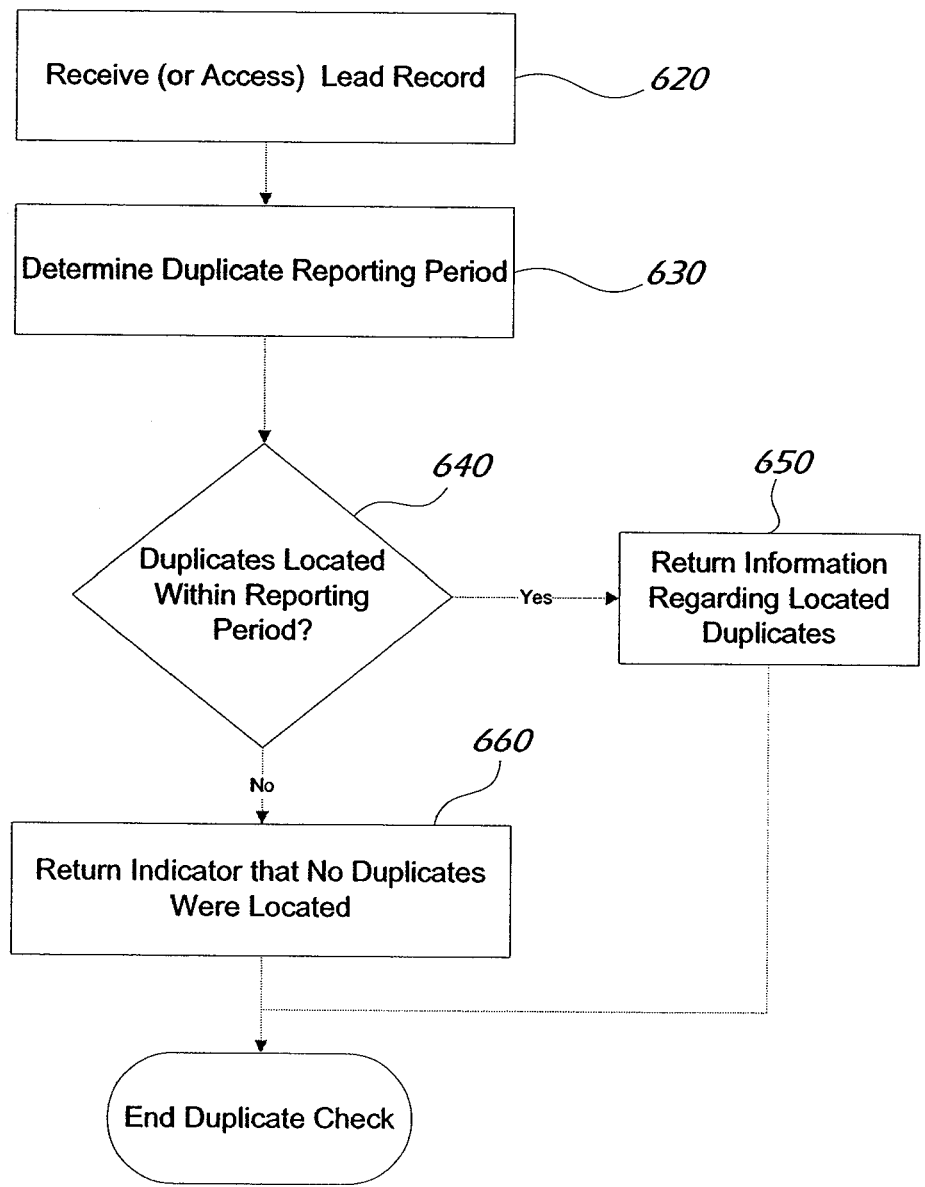
FIG. 6B is a flowchart illustrating one embodiment of a method that may be performed by the dupe-check module.

Moving to a block 430, the received lead record 140 is analyzed to determine if a similar or identical lead has previously been received from the client 130, or a related group of clients. In one embodiment, the client 130 periodically transmits a list of lead records to the enhancement module 110 and requests return of enhanced lead records. Thus, there is a possibility that multiple leads for a single potential customer exist and are transmitted to the enhancement module 110 in separate lead lists, or possibly within a single lead list. Many clients 130 do not want duplicate lead records enhanced by the enhancement module 110. Accordingly, in block 430, a received lead record is analyzed in order to determine if the potential customer identified associated with lead record has previously been associated with a received lead record from the same client 130. In one embodiment, the enhancement module 110 maintains a list of lead records and/or potential customers identified in lead records that have been received from each client. Accordingly, the duplicate check performed in block 430 may append a received lead record with information regarding previously received lead records in order to determine if the new lead record is a duplicate. FIGS. 6A-6B illustrate one embodiment of an apparatus and process for performing a duplicate check, such as by the dupe-check module 158 of FIG. 2.

Next, in a block 440, an email address data item in the received lead record 140 is validated. In one embodiment, the format of the email address is analyzed to determine if the syntax of the email address is proper. In another embodiment, the email address may be tested to determine if the email account exists, such as by used methods that are currently known in the art. In one embodiment, information regarding the email address is included in the enhanced lead record 150.

In certain embodiments, email addresses included in lead records and/or received from one or more of the data sources 120 are compared against one or more lists of known bad email addresses, where bad email addresses comprise unreachable, non-existent, syntactically incorrect, and/or spam email addresses. For example, in one embodiment a list of known bad email address (also referred to as a "hard bounce list") is accessed by the lead enhancement module 110 in order to determine if one or more email addresses in a lead record are included in the hard bounce list. In one embodiment, lead records having one or more email addresses on a hard bounce list are flagged as containing invalid email addresses and further enhancement of the leads is optionally halted, based on client 130 business rules, for example. In one embodiment, a hard bounce list is maintained by the enhancement provider and additional hard bounce lists may be maintained by other entities, such as a client 130 that sends lead records to the enhancement module 110, and accessed by the enhancement module 110. Accordingly, email addresses that are know to be bad by a client 130 may be flagged and/or not further processed by the lead enhancement module 110.

In one embodiment, certain email providers have email address rules that must be followed for any user to establish an email address with the email provider's domain(s). In one embodiment, these provider-specific rules may be applied to email addresses comprising the respective domains in order to determine if the provider-specific rules are satisfied. For example, email addresses from the aol.com domain may be associated with a first set of provider-specific rules, while email addresses from yahoo.com may have another set of provider-specific rules. For example, valid aol.com email address may require that the username portion (the portion prior to the @aol.com) comprises only alphanumeric characters (e.g., cannot contain punctuation characters or underscores), the first character is a letter, and the username portion comprises from 3-16 characters. In contrast, valid yahoo.com email address may require that the username portion comprises only letters, numbers, '-' or '_' and no more that 40 characters. Other email providers may have various rules for establishing valid usernames for email accounts. In one embodiment the email address validation that is performed in block 440 of the preprocessing method may apply different rules to email addresses depending on the domain name included in the email address. Accordingly, email addresses from aol.com, yahoo.com, msn.com, and hotmail.com may each be evaluated based on different rules that are specific to their respective email providers in order to locate email addresses that don't satisfy the rules and are therefore determined to be syntactically incorrect. As those of skill in the art will recognize, even some addresses that are syntactically correct may be bad, such as those addresses that are associated with known spammers or are unreachable. Thus, in certain embodiments multiple bad email lists may be applied to email addresses in lead records, either separately or in a combined bad email list, in order to more comprehensively determine the likelihood that email addresses are bad.

C. Syntax Check

FIG. 5A is a block diagram illustrating a syntax module 152 receiving information regarding a lead record 140 and outputting one or more syntax indicators 510 regarding the lead record. In one embodiment the syntax indicators 510 are included in the enhanced lead record 150. In another embodiment, the syntax indicators 510 from the syntax module 152 are accessed by the enhancement module 110 and information regarding the indicators is included in the enhanced lead record 150.

FIG. 5B is a flowchart illustrating one embodiment of a method that may be performed by the syntax module 152. As noted above, the syntax module 152 analyzes certain fields of the lead record 140 in order to determine if the syntax of the data items in those fields are formatted properly and if the lead record 140 comprises at least a minimum amount of data items in their respective data fields.

Beginning in a block 520, the lead record 140 is received by the syntax module 152 or portions of the lead record 140 are accessed by the syntax module 152. In one embodiment, the received lead record 140 is stored by the enhancement module 110, such as on the mass storage device 120. Thus, in one embodiment a wired and/or wireless communication channel between the syntax module 152 and the stored lead record is established.

Continuing to a block 530, the lead record 140 is analyzed to determine if it meets at least one of the minimum data requirements. For example, in one embodiment, the minimum data requirements indicate that a lead record must comprise at least valid last name, street address, city, and state data items. In another embodiment, the minimum data requirements indicate that a lead record must comprise at least valid last name, street name, and ZIP code data items. In other embodiments, other minimum data requirements are applied on a received lead record. In one embodiment, if any of the minimum data requirements are met then the lead 140 is determined to satisfy the minimum data requirements. If the lead record 140 does not satisfy the minimum data requirements, the method continues to a block 540 where an indicator that the syntax check has failed is returned. Alternatively, if the lead record 140 satisfies at least one of the minimum data requirements, the method continues to a block 550 where the syntax of certain data items is analyzed.

Moving to a block 550, certain data items of the lead record 140 are analyzed in order to determine if those data items are in an acceptable syntactic format. For example, data items of certain fields, such as the name and address fields, may be analyzed in order to determine if the text is in an unknown format or language. In one embodiment, one or more of the data items are analyzed to determine if the data items contain non-Western encoding, for example. Additionally, email addresses may be analyzed to determine if a syntactically correct email address format is used. If the analyzed data items are syntactically acceptable, the method continues to a block 560. However, if the analyzed data items are not syntactically acceptable, the method continues to a block 540 where the syntax module 152 returns at a syntax indicator 510 indicating that one or more of the data items are syntactically unacceptable.

In a block 540, the syntax indicator 510 from the syntax module 152 indicates that the lead record does not meet at least one of the minimum data requirements and/or the syntax of certain data items is not acceptable. In one embodiment, the requirements for both the minimum data requirements (block 540) and the syntax check (block 550) are determined by client preferences and/or default preferences. In one embodiment, in block 540 the syntax module indicates that the remaining preprocessing and other enhancement processes should not be performed. In another embodiment, however, even lead records that do not meet the minimum data requirements or syntax checks are further processed, with an indication of the failure being included in the enhanced lead record 150, for example.

Continuing to a block 560, a syntax indicator indicating that the syntax checks succeeded is generated. After generating either a failed syntax indicator in block 540 or a success syntax indicator in block 560, the method continues to a block 570 that ends the syntax check by the syntax module 152.

D. Duplicate Check

FIG. 6A is a block diagram illustrating the dupe-check module 158 receiving information regarding a lead record 140 and outputting one or more indicators 610 regarding the lead record. In one embodiment the duplicate indicators 610 are included in the enhanced lead record 150. In another embodiment, the duplicate indicators 610 from the dupe-check module 158 are accessed by the enhancement module 110 and information regarding the indicators is included in the enhanced lead record 150.

FIG. 6B is a flowchart illustrating one embodiment of a method that may be performed by the dupe-check module 158. As noted above, the dupe-check module 158 generally determines whether a received lead record has already been received by the enhancement model 110 from the same client, or from a related group of customers, optionally within a predetermined period.

Beginning in a block 620, the lead record 140 is received by the dupe-check module 158 or portions of the lead record 140 are accessed by the dupe-check module 158. In one embodiment, the received lead record 140 is stored by the enhancement module 110, such as on the mass storage device 120. Thus, in one embodiment a wired and/or wireless communication channel between the dupe-check module 158 and the stored lead record is established.

Continuing to a block 630, a duplicate reporting period is determined. The duplicate reporting period is a period of time in which duplicate lead records are to be reported by the lead enhancement module 110. Thus, the lead record 140 is only considered a duplicate if a lead corresponding to the same potential customer was received by the enhancement module within the previous duplicate reporting period. In one embodiment, a default duplicate reporting period, such as three months, six months, or one year, may be used. In other embodiments, the particular client may determine specific duplicate reporting periods that are more advantageous to the client needs. In one embodiment, there is no duplicate reporting period, but instead all lead records previously received from a client, or group of clients, are analyzed by the dupe-check module 158.

Moving to a block 640, the dupe-check module 158 searches for duplicate records from the client received within the reporting period. If duplicate records are located within the reporting period, the method continues to a block 650, where information regarding the located duplicates is returned in the duplicate indicators 610. In one embodiment, information regarding the located duplicate records is returned as part of the duplicate indicators 610. In another embodiment, a summary of the one or more duplicates located is returned in the duplicate indicators 610, such as indications of the dates when the duplicates were received. For certain clients, an indication that a lead has been included in their lead database multiple times indicates a high priority lead. For example, if a potential customer of an automobile retailer client has completed multiple forms indicating interest in a particular make and/model of automobile, the potential customer may be considered a highly interested potential customer and may be flagged as such to the client 130. In one embodiment, the dupe-check module 158 comprises a dupe counter that tracks a number of duplicate leads for each potential customer, possibly within a specified time period, and notifies the client 130 when the counter reaches one or more predetermined thresholds. For other customers, an indication that a lead has been included in their lead database multiple times indicates that a lead supplier is supplying unwanted duplicate leads. Thus, information regarding the number of duplicates for a particular lead record or for a lead list may be included in the duplicate indicators 610 and the enhanced lead record 150.

Figure 7:
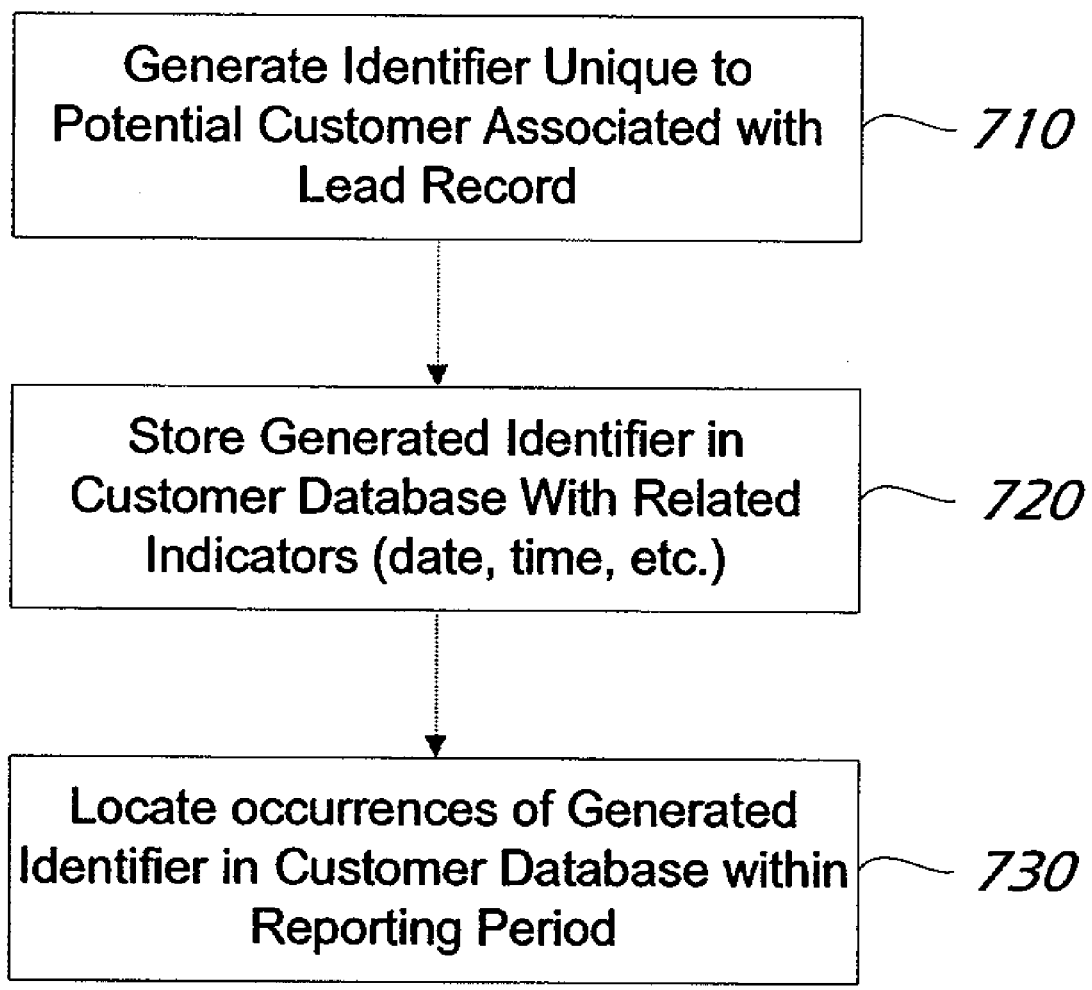
FIG. 7 is a flowchart illustrating one embodiment of a method of locating duplicate lead records.

In one embodiment, the dupe-check module 158 compares one or more data items of the lead record to the corresponding data items of previously received leads in order to determine if the received lead record 140 is a duplicate. For example, in one embodiment, if the surname, first name, and address data items of the lead record 140 match the surname, first name, and address data items of a previously received lead record, the lead record 140 is classified as a duplicate. In other embodiments, other fields of the lead record are compared to corresponding fields in previously received leads in order to determine whether the lead is a duplicate. In one embodiment, additional fields of a lead record are analyzed for a common name as compared to a less common name. For example, if the full name in a lead is "John Smith," fields other than surname and last name may be analyzed. However, if the full name is "Mikayla Wasanovich," fields in addition to the surname and first name fields may not need to be analyzed in order to determine if there is a duplicate lead. FIG. 7 illustrates another embodiment of a method for locating duplicate leads received from a client. In the embodiment of FIG. 6, if no duplicate records are located for the lead record 140, the method continues to a block 660.

In a block 660, the duplicate indicator 610 is generated to include indicators that no duplicates for the potential customer associated with the lead record 140 were located within the reporting period for the customer.

FIG. 7 is a flowchart illustrating one embodiment of a method of locating duplicate lead records. More particularly, the method of FIG. 7 locates previously received lead records that are associated with the potential customer that is associated with the lead record 140. In the embodiment of FIG. 7, an indicator for each received lead record is determined, wherein a single indicator is associated with each potential customer. Thus, if the generated indicator for the lead record 140 matches an indicator associated with a lead that was previously received by the enhancement module 110, the two leads are considered duplicates. In this embodiment, the data items of the lead records do not need to be stored by the enhancement module 110 in order to determine future duplicate lead records. Instead, the indicator associated with the lead records may be stored and then compared with future indicators for received lead records in order to locate duplicates.

Beginning at a block 710, an identifier that is unique to the potential customer associated with a received lead record is generated. Advantageously, lead records that include different pieces of information regarding a particular potential customer are assigned the same unique identifier, thus enhancing the ability to locate duplicate leads when the data items do not exactly match. In one embodiment, the identifier is generated by performing hash operations on one or more data items in the lead record.

Continuing to a block 720, the generated identifier is stored in a client database with related indicators, such as a date and time that the lead record was received. In one embodiment, a lead indicator for a potential customer may comprise a series of characters, for example, ASCII characters, such as 10, 50, 100, 1000, or more characters, for example. In block 720, this indicator may be stored in a database via the lead enhancement module 110, where the database stores identifiers for lead records received from a particular client.

Moving to a block 730, occurrences of the generated identifier, if any, are located in the client database. The time that has lapsed between receipt of the current lead and the lead associated with the located duplicate identifier may then be analyzed to determine if the duplicate is within a client specific or default reporting period. For example, if the reporting period is one year, the identifiers stored in the client database within the previous one year period are analyzed to determine if any identifiers match the newly generated identifier for the received lead record.

E. Spoof Check

FIG. 8A is a block diagram illustrating a spoof module 160 receiving information regarding a lead record 140 and outputting one or more spoof indicators 810 regarding the lead record. In one embodiment the spoof check results 810 are included in the enhanced lead record 150. In another embodiment, the spoof check results 810 from the spoof check module 160 are accessed by the enhancement module 110 and information regarding the results 810 is included in the enhanced lead record 150.

FIG. 8B is a flowchart illustrating one embodiment of a method that may be performed by the spoof module 160. In general, the spoof module 160 identifies text strings in the lead record 140 that suggest the lead record 140 does not contain information that accurately describes the potential customer that provided the data items in the lead record 140. By identifying spoof leads, time and costs associated with attempting to contact the potential customer may be reduced or eliminated.

Beginning in a block 820, the lead record 140 is received by the spoof module 160 or portions of the lead record 140 are accessed by the spoof module 160. In one embodiment, the received lead record 140 is stored by the enhancement module 110, such as on the mass storage device 120. Thus, in one embodiment a wired and/or wireless communication channel between the spoof module 160 and the stored lead record is established.

Continuing to a block 830, selected data items of the lead record 140 are compared with text strings located in a spoof word database. As noted above, the spoof word database includes words that, if found in a lead record, indicate that the lead record does not accurately identify the individual that provided the data items. For example, spoof words may contain vulgar words. In one embodiment, a spoof word database is maintained by the lead enhancement provider and is used to identify spoof words in received lead records. In another embodiment, a client may supply a spoof word database, and/or may request use of a third-party spoof word database. In one embodiment, only the first name and surname data items are compared to text strings in the spoof word database. In other embodiments, additional data items are compared to text strings in the spoof word database.

Next, in a block 840, the spoof module 160 determines if a match between a text string in a spoof word database and a data item in the lead record is found. In one embodiment, exact matches between text strings in the spoof word database and data items in the lead record indicate a match. In other embodiments, partial matches between data items in a lead record and text strings in the spoof word database indicate a match. If a match is located, the method continues to a block 850 where an indicator that spoof words were located in the lead record is returned. In one embodiment, the spoof check results 810 comprise an indicator of whether or not spoof words were located in the lead record. In one embodiment, the spoof check results 810 indicate the number of spoof words located in the lead record, the data items in that lead record that matched the spoof words, and any other information resulting from the comparison of the text strings in the spoof word database to the data items in the lead record. For example, in one embodiment the spoof check results 810 include a spoof score representative of likelihood that the lead comprises spoof words. In one embodiment, the spoof score is based at least partly on a percentage match of one or more data items in the lead record to one or more spoof words.

If no match is located in block 840, the method continues to a block 860 where an indicator that no spoof words were located is returned, and possibly indicated in the enhanced lead record 150. In one embodiment, the spoof check results 810 provide such an indication. In one embodiment, if one or more spoof words are located in the lead record 140 in block 840, the spoof check results are immediately provided to the client 130 and the remainder of the enhancement processes originally intended for the lead record are aborted. In another embodiment, even if spoof words are located in the lead record 140, any remaining one or more of the enhancement processes are performed on the lead record 140.

F. Information Append

FIG. 9A is a block diagram illustrating an information append module 154 receiving information regarding a lead record 140 and outputting one or more indicators 910 regarding the lead record, such as information items that may be included in the enhanced lead record 150 or otherwise appended to the lead record 140. In the embodiment of FIG. 9A, the information append module 154 is in communication with a data source 920. In one embodiment, the data source 920 comprises a third-party data repository that provides information regarding a potential customer, such as an individual, a couple, or a business, for example, in response to receiving certain information regarding the potential customer. In certain embodiments, one of the data sources 120 (FIG. 1) comprise the data source 920. In one embodiment, for example, the data source 920 receives as an input a first name, surname, and address of a potential customer from the received lead record 140. More particularly, the information append module 154 may transmit the first name, surname, and address data items to the data source 920 via one or more networks, such as via network 135 or 160 (FIG. 1). In another embodiment, the data source 920 is maintained by the lead enhancement provider. In one embodiment, the append information 910 is included in the enhanced lead record 150. In another embodiment, the append information 910 is accessed by the enhancement module 110 and information regarding the append information 910 is included in the enhanced lead record 150.

FIG. 9B is a flowchart illustrating one embodiment of a method that may be performed by the information append module 154. Beginning in a block 930, the lead record 140 is received by the information append module 154 or portions of the lead record 140 are accessed by the information append module 154. In one embodiment, the received lead record 140 is stored by the enhancement module 110, such as on the mass storage device 120. Thus, in one embodiment a wired and/or wireless communication channel between the information append module 160 and the stored lead record is established.

Continuing to a block 940, information regarding the potential customer associated with the lead record 140 is received from the data source 920. As noted above, the information append module 154 may transmit certain data items from the lead record 140 to the data source 920 with a request to return any additional information regarding the potential customer identified in the data items. In one embodiment, the data source 920 returns an address, email address, and/or phone number for the individual identified in the lead record 140. In another embodiment, the data source 920 only returns additional information if the information is different than the data items received from the append module 154. For example, if the data source 920 includes a telephone number for an individual with the same surname and first name as received from the append module 152, where the telephone number is different than a telephone number in the lead record 140, the data source 920 may return the telephone number, which may be included in the enhanced lead record 150 as described further below.

Moving to a block 950, the information append module 154 determines if the information received from the data source 920 should be included in the enhanced lead record 150. In one embodiment, any information received from the data source 920 that is different from the data items in the lead record 140 is included in the enhanced lead record 150. In another embodiment, only certain data items are included in the enhanced lead record 150, such as, for example, a telephone number that is different than a telephone number provided in the lead record 140. In one embodiment, information is received by the information append module 154 from more than one data source 920. In this embodiment, information that is common in multiple data sources 920, but different from the data item in the lead record 140, is more likely to be included in the enhanced lead record 150. For example, if the lead record 140 indicates a first telephone number for a potential customer, while a first and second data source 920 each return a second telephone number for the potential customer, the second telephone number may be included in the enhanced lead record 150, possibly with an indication that the second number is more likely the correct telephone number for the potential customer.

If additional information regarding the potential customer is received from the data source 920, the method continues to a block 960 where the additional information is included in the enhanced lead record 150. For example, if a telephone number different from that telephone number in the lead record 140 is received from the data source 920, the telephone number from the data source 920 may be included in the enhanced lead record 150.

If additional information regarding the potential customer is not received from the data source 920, the method moves to a block 970 where no additional information is included in the enhanced lead record 150.

G. Lead Scoring

FIG. 10A is a block diagram illustrating the scoring module 156 receiving information regarding a lead record 140 and providing a contactability score 1010 for the lead record 140. In the embodiment of FIG. 10, the scoring module 156 is in communication with data sources 120A, 120B (FIG. 1), and possibly additional data sources. In one embodiment, the data sources 120 comprise third-party data repositories that provide information regarding potential customers in response to receiving information regarding the potential customers. For example, in one embodiment the data sources 120 receive as an input a first name, surname, and address of an individual from the received lead record 140. More particularly, the scoring module 154 may transmit the first name, surname, and address of the individual to one or both of the data sources 120 via one or more networks, such as via network 135 or 160. In another embodiment, one or more of the data sources 120 is maintained by the lead enhancement provider. The output from the scoring module 156 is a contactability score 1010 that is indicative of a likelihood that the potential customer identified in the enhanced lead record 150 may be contacted using the contact information in the enhanced lead record 150, such as the telephone number.

FIG. 10B is a flowchart illustrating one embodiment of a method that may be performed by the scoring module 156. In general, the scoring module 156 receives information indicating relationships among data items in the lead record 140, and based at least partly on these relationships, the scoring module 156 determines a contactability score for the lead record 140. In one embodiment, certain of the data items of the lead record 140 are appended with additional information in the enhanced lead record 150. In these embodiments, the contactability score may be generated based on the information in the enhanced lead record 150 and/or the lead record 140.

Beginning in a block 1020, information regarding the potential customer associated with the lead record 140 is received from the first data source 120A. For example, the data source 120 may transmit a telephone number, email address, residential address, and/or other information regarding the lead 140 to the scoring module 156. The information from the data source 120A may be responsive to transmission of data items from the lead record 140 to the data source 120A from the scoring module 156. In one embodiment, the first information from the data source 120A comprises a code that is indicative of a relationship between data items transmitted to the data source 120A. For example, a first code returned from the data source 120A may indicate that the data source 120A located a record having a first name, surname, and telephone number matching the corresponding data items from the lead record. Likewise, a second code returned from the data source 120A may indicate that the data source 120A located a record having a surname and telephone number matching the corresponding data items from the lead record.

Figure 11:
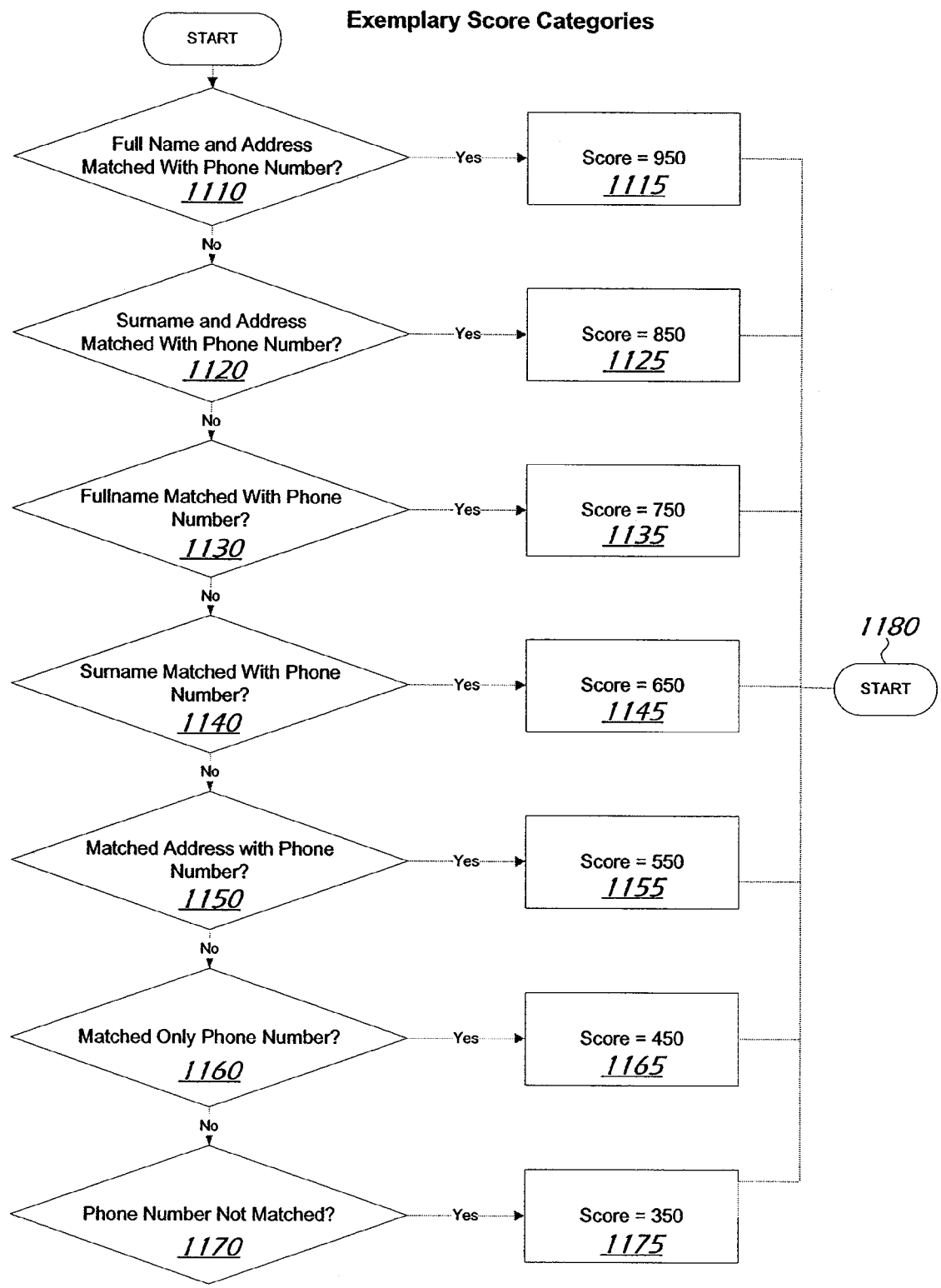
FIG. 11 is a flowchart illustrating one embodiment of a method for correlating information regarding a relationship between certain data items of a lead record to a preliminary contactability score.

Continuing to a block 1030, the first information received from the first data source 120A is correlated to a first preliminary contactability score. In one embodiment, the data source 120A returns an indication as to whether certain data items of the lead record 140 are correctly correlated. For example, in one embodiment the first name, surname, residential address, and telephone number data items of the lead record are transmitted to the data source 120A. The data source 120A analyzes data in its data repository in order to determine whether the received data items are properly correlated. The data source 120A may then provide first information to the scoring module 156, the first information being indicative of a correlation between certain of the data items. For example, the first information may indicate that the full name and residential address of the lead corresponds with the provided telephone number. This first information is then correlated with a first preliminary contactability score. For example, if the first information indicates that the full name and residential address of the lead corresponds with the provided telephone number, the first preliminary contactability score may be an "A," indicating that the potential customer is likely contactable using the provided telephone number. However, if the first information indicates that only the surname was correlated with the provided telephone number then the first preliminary contactability score may be a "D," indicating that the potential customer is less likely to be contactable using the provided telephone number. FIG. 11 illustrates exemplary relationships between data items that may be identified by either of the data sources 120, along with contactability scores that may be correlated with each relationship.

Moving to a block 1040, the scoring module determines if the first preliminary contactability score is above a first threshold. In the case of academic contactability score, such as A-F, the threshold may be set at "C", "D", or any other level. Thus, if the first preliminary contactability score is "D" and the threshold is "C", the method continues to a block 1060. However, if the first preliminary contactability score is "B" and the threshold is "C", the method continues to a block 1050 where the contactability score 1010 that will be returned in the enhanced lead record 150 is set equal to the first preliminary contactability score.

As noted above, if the first preliminary contactability score is lower than a threshold score, the method continues to a block 1060. In block 1060, second information from a second data source 120B is received by the scoring module 156 and considered in generation of the contactability score 1010. Similar to the communication between the scoring module 156 and the first data source 120A, certain data items of the lead record 140 may be transmitted to the second data source 120B along with a request for the second data source 120B to return second information regarding a relationship between the transmitted data items.

Continuing to a block 1070, the second information received from the second data source 120B is correlated to a second preliminary score. Similar to the first information received from the first data source 120A, the second information indicates a relationship between data items transmitted to the data source 120B. This second information may be in the form of a code unique to the second data source 120B or may be a commonly used scoring indicator. In one embodiment, an academic score, such as A-F is correlated with the second information.

Next, in a block 1080, the contactability score is set equal to the highest of the first or second preliminary contactability scores. For example, if the first preliminary contactability score is "C" and the second preliminary contactability score is "B", the contactability score 1010 that is included in the enhanced lead report 150 is "B". Thus, by accessing multiple data sources 120 in order to correlate data items of a lead record, the method of FIG. 10A advantageously increases a number of lead records that will have higher contactability scores, such as "A" or "B".

FIG. 11 is a flowchart illustrating one embodiment of a method for correlating information regarding a relationship between certain data items of a lead record to a preliminary contactability score. In one embodiment, the information regarding the data item relationship is received from a data source that comprises data records for individuals including at least some of the same data fields as are included in the lead record 140. For example, the data source may comprise records including surname, first name, telephone number, and address information for a plurality of individuals. Thus, in one embodiment, the accuracy of certain data items in the lead record 140 may verified by identifying similarly associated data items in other data sources. In one embodiment, the data source 120A comprises Experian's Checkpoint product, for example.

In the embodiment of FIG. 11, the received information from the data sources 120 (FIG. 1) indicates a relationship between a telephone number data item and one or more other data items of a lead record 140. Thus, the information from the data sources 120 may be used as an indicator of a likelihood that the telephone number data item represents a valid telephone number for the potential customer associated with the lead record 140. In the embodiment of FIG. 11, contactability scores are scores that are akin to credit scores, where a contactability score of 950 is the highest score and a contactability score of 350 is the lowest score. In this embodiment, acceptable contactability scores may be those score that are above a predetermined threshold, such as 400 or 500, for example. In other embodiments, other ranges of contactability scores may be associated with phone data item(s) associated with a lead record, such as the ranges 350-840, 300-850 or 501-990, for example. In other embodiments, the contactability scores comprise letter scores, such as from "A" to "F," where A represents the highest likelihood that the telephone number data item represents a number at which the potential customer associated with the lead may be reached.

Beginning at a decision block 1110, the scoring module 156 determines if the information from a data source 120 indicates that the full name and address of the potential customer matches the telephone number in the lead record 140. For example, if the data source 120 comprises a record with the same full name, address, and telephone number as received from the scoring module 156, the information from the data source 120 will indicate that the full name and address of the lead match the lead phone number and the method will continue to a block 1115 where a contactability score, or preliminary contactability score, of 950 is assigned to the lead. In one embodiment, the determination of whether the full name and address match the phone number in the lead 140 is determined by interpreting a code included in the information received from the data source 120. In other embodiments, the preliminary contactability score is numerical, such as in the range of 1-10. In this embodiment, in block 1115 a high contactability score, such as "1" may be assigned to the lead. In either case, the contactability score assigned in block 1115 indicates that there is a high likelihood that the potential customer may be contacted at the telephone number included in the lead.

Continuing to a decision block 1120, the scoring module 156 determines if the information from a data source 120 indicates that the surname and address of the potential customer matches the telephone number in the lead record 140. For example, if the data source 120 comprises a record with the same surname, address, and telephone number as received from the scoring module 156, the information from the data source 120 will indicate such and the method will continue to a block 1125 where a contactability score, or preliminary contactability score, of 850 is assigned to the lead. In one embodiment, the determination of whether the surname and address match the phone number in the lead 140 is determined by interpreting a code included in the information received from the data source 120. In an embodiment where numerical scores from 1-10 are assigned as contactability score (where "1" is the highest score), in block 1125 a relatively high contactability score, such as "2" may be assigned to the lead. In either case, the contactability score assigned in block 1125 indicates that there is a relatively high likelihood that the potential customer may be contacted at the telephone number included in the lead.

Continuing to a decision block 1130, the scoring module 156 determines if the information from a data source 120 indicates that the full name of the potential customer matches the telephone number in the lead record 140. For example, if the data source 120 comprises a record with the same full name and telephone number as received from the scoring module 156, the information from the data source 120 will indicate such and the method will continue to a block 1135 where a contactability score, or preliminary contactability score, of 750 is assigned to the lead. In one embodiment, the determination of whether the full name and address match the phone number in the lead 140 is determined by interpreting a code included in the information received from the data source 120. In an embodiment where numerical scores from 1-10 are assigned as contactability score (where "1" is the highest score), in block 1135 a moderately high contactability score, such as "3" may be assigned to the lead.

Continuing to a decision block 1140, the scoring module 156 determines if the information from a data source 120 indicates that the surname of the potential customer matches the telephone number in the lead record 140. For example, if the data source 120 comprises a record with the same surname and telephone number as received from the scoring module 156, the information from the data source 120 will indicate such and the method will continue to a block 1145 where a contactability score, or preliminary contactability score, of 650 is assigned to the lead. In one embodiment, the determination of whether the full name and address match the phone number in the lead 140 is determined by interpreting a code included in the information received from the data source 120. In an embodiment where numerical scores from 1-10 are assigned as contactability scores (where "1" is the highest score), in block 1145 a moderate contactability score, such as "4" may be assigned to the lead.

Continuing to a decision block 1150, the scoring module 156 determines if the information from a data source 120 indicates that the address of the potential customer matches the telephone number in the lead record 140. In one embodiment, the determination of whether the full name and address match the phone number in the lead 140 is determined by interpreting a code included in the information received from the data source 120. If the address of the potential customer matches the telephone number in the lead record 140, the method continues to a block 1155 where a contactability score of 550 is associated with the lead. In an embodiment where numerical scores from 1-10 are assigned as contactability scores (where "1" is the highest score), in block 1155 a moderately low score, such as "8" may be assigned to the lead, indicating that there is a moderately low probability that the potential customer may be reached at the telephone number included in the lead.

Continuing to a decision block 1160, the scoring module 156 determines if the information from a data source 120 indicates that the telephone number in the lead record 140 was located in the data source 120. If the phone number is located in the data source 120, the method continues to a block 1165 where a contactability score of 450 is associated with the lead. In an embodiment where numerical scores from 1-10 are assigned as contactability scores (where "1" is the highest score), in block 1135 a low score, such as "9" may be assigned to the lead, indicating that there is a low probability that the potential customer may be reached at the telephone number included in the lead.

Continuing to a decision block 1170, the scoring module 156 determines if the information from a data source 120 indicates that the telephone number in the lead record 140 is not located in the data source 120. If the phone number is not located in the data source 120, the method continues to a block 1175 where a contactability score of "Y" is associated with the lead. In an embodiment where numerical scores from 1-10 are assigned as contactability scores, in block 1135 a very low score, such as "10" may be assigned to the lead, indicating that there is a very low probability that the potential customer may be reached at the telephone number included in the lead.

Figure 12:
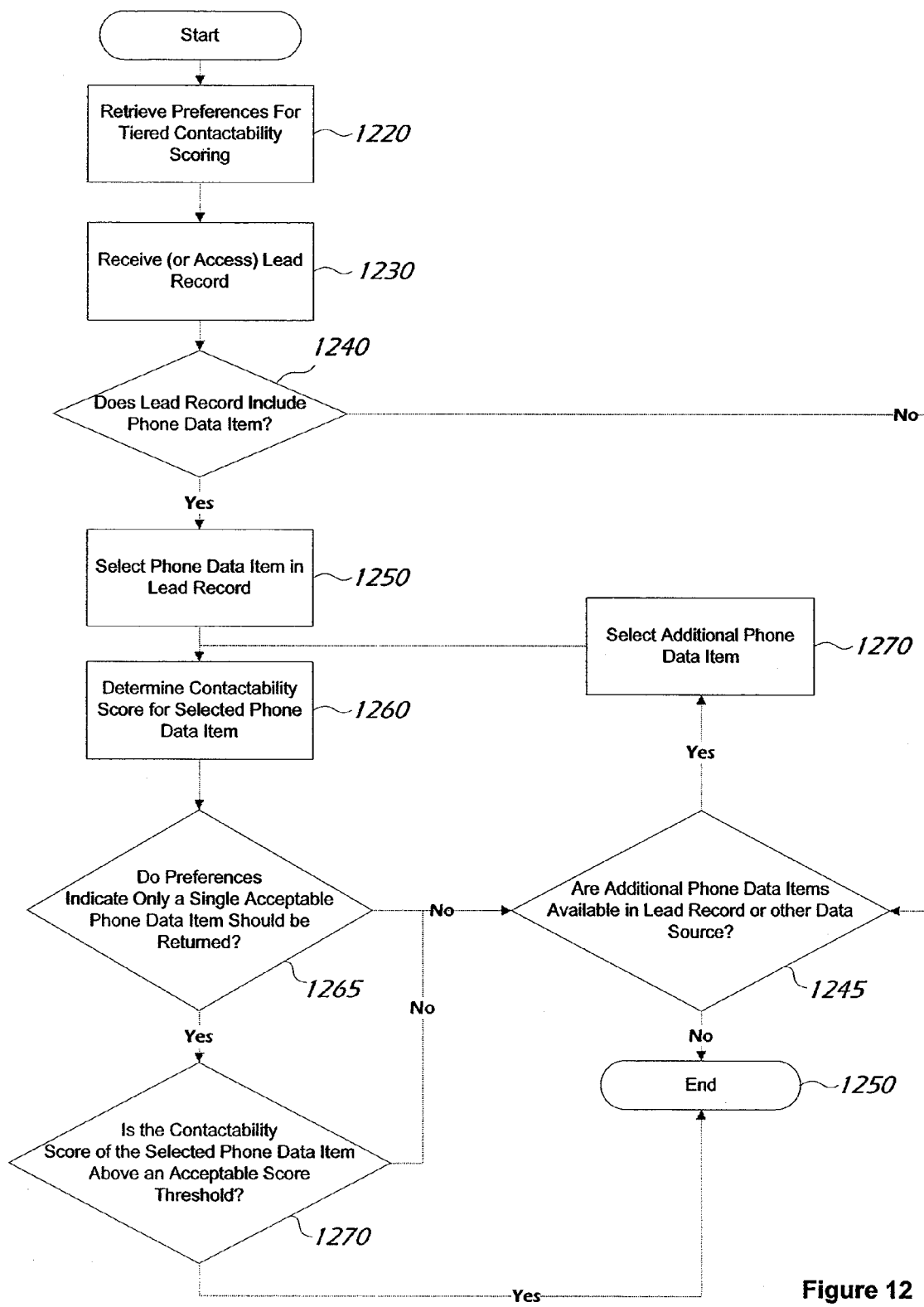
FIG. 12 is a flowchart illustrating one embodiment of a method of determining one or more contactability scores according to preferences for a tiered analysis of telephone data items, or other information.

FIG. 12 is a flowchart illustrating one embodiment of a method of performing a tiered contactability score generation. In the embodiment of FIG. 12, the scoring module 156 may perform multiple checks on contact information associated with a potential customer in order to determine one or more contactability scores for the customer. In one embodiment, the method of FIG. 12 is performed by the scoring module 156 of the enhancement module 110 (FIG. 2). In other embodiments, the method of FIG. 12 may be performed by other devices or modules.

Beginning in a block 1220, preferences for tiered contactability scoring are determined and/or retrieved by the scoring module 156. These preferences indicate, for example, a number of contactability scores to be returned, an acceptable score threshold, whether additional telephone numbers should be retrieved from external data sources and scored, and whether additional contact information, such as physical address and email address of the potential customer, should be scored. For example, in one embodiment the preferences indicate that contactability scores for each of multiple telephone numbers that are included in the received lead, or acquired from external sources such as data sources 120A and 120B, should be included in the enhanced lead record. In another embodiment, the preferences indicate that only a telephone number that has the highest contactability score should be returned in the enhanced lead record. Although the flowchart of FIG. 12 is discussed with respect to a telephone data item, which comprises a telephone number for example, the method described in FIG. 12 may also be used with respect to other contact information, such as a physical address or an email address of a potential customer.

Moving to a block 1230, a lead record is received or accessed by the scoring module 156. In one embodiment, the lead module 156 has already been preprocessed using one or more of the enhancement methods described in FIG. 4, for example. In other embodiments, received lead records are scored prior to performing other enhancements on the lead records.

Continuing to a block 1240, the scoring module 156 determines if the lead record includes a phone data item comprising, for example, a telephone number. In some embodiments, certain lead records will comprise multiple phone data items, while in other embodiments, certain lead records will include no phone data items. Thus, in block 1240 the scoring module 156 determines whether or not the received lead record comprises a phone data item that can be assigned a contactability score. If the lead record does not include a phone data item, the method continues to a block 1245, where the scoring module 156 determines if additional phone data items are available in the lead record or other data sources. In one embodiment, additional information regarding a potential customer may be retrieved from external data sources, such as data sources 120. Thus, in one embodiment the preferences for tiered score generation may indicate that the scoring module 156 should attempt to retrieve additional phone data items from such external data sources. Accordingly, in block 1245, the scoring module 156 may communicate with one or more data sources in order to determine if additional phone data items are available.

In one embodiment, the method performed by the scoring module at block 1245 comprises sending the available contact information to the data source 120 with a request to return any additional phone data items that are associated with the potential customer associated with a received lead record. In this embodiment, if the data source 120 returns a phone data item the returned phone data item may be scored by the scoring module 156, such as by using the method of FIG. 10B.

If the scoring module 156 determines that there is a phone data item in the received lead record in block 1240, the method continues to a block 1250 where the phone data item in the lead record is selected for scoring.

Moving to a block 1260, the scoring module 156 determines a contactability score for the selected phone data item. As noted above, the selected phone data item may be a telephone data item included in the received lead record or a telephone data item retrieved from a data source, such as one or more of the data sources 120. In one embodiment, a contactability score for a particular phone data item is associated with the phone data item based on information regarding the phone data item that has been received from one or more data sources 120. For example, the contactability score may be determined using one or more of the data sources 120, such as using the method of FIG. 10B. In other embodiments, the contactability score for a phone data item is determined in other manners.

Moving to a block 1265, the scoring module 156 determines if the tiered contactability scoring preferences indicate that only a single acceptable phone data item should be returned in the enhanced lead record. In one embodiment, the client may determine that only a single contactability score that exceeds a predetermined acceptable scoring threshold should be returned in the enhanced lead record. In this embodiment, the first contactability score that exceeds a scoring threshold may be returned to the client, and scoring of additional phone data items may be halted. In another embodiment, the preferences may indicate that contactability scores for each of available telephone data item are retrieved, but only the phone data item associated with the highest contactability score should be returned in the enhanced lead record. In another embodiment, the preferences may indicate that all telephone data items with their associated contactability scores should be returned in the enhanced lead record. In block 1265, if the scoring module 156 determines that only a single phone data item should be returned, the method continues to a block 1245, where the scoring module 156 determines if additional phone data items are available. As described above, in block 1245 the scoring module may access the lead record, as well as one or more external data sources, in order to locate additional phone data items.

In block 1265, if the preferences indicate that multiple phone data items should be returned, the method continues to a block 1270, where the contactability score of the selected phone data item is compared with an acceptable score threshold. In one embodiment, a default acceptable score threshold may be set by the scoring module 156 and compared to the contactability scores associated with phone data items. In other embodiments, the client may indicate an acceptable score threshold in the tiered contactability preferences. If the contactability score associated with the selected phone data item is above an acceptable score threshold the method continues to an end block 1280.

In another embodiment, the tiered contactability preferences may indicate that multiple acceptable contactability scores should be returned in the enhanced lead record. In this embodiment, in block 1270 the scoring module may determine if the determined number of acceptable contactability scores have been located before moving to the end of block 1280.

In block 1270, if the contactability score is below the acceptable score threshold the method moves to block 1245, where the scoring module 156 attempts to locate additional phone data items in the received lead record or other data sources.

In block 1245, if no additional phone data items are available in the lead record or other data sources, such as data sources 120, the method moves to the end block 1280.

H. Example Stage I Lead Enhancement

FIG. 13 illustrates certain data items of two exemplary lead records 1210A, 1210B, as wells as the results of certain lead enhancement processes performed using data items of the exemplary lead records. More particularly, FIG. 13 illustrates first and second lead records 1210A, 1210B, including multiple fields and data items associated with those fields. In the embodiment of FIG. 13, the lead records 1210A, 1210B each include a last name, first name, street address, ZIP code, telephone, and email field. In other embodiments, fewer or additional fields may be included in the lead records 1210.

In the embodiment of FIG. 13, a syntax check is performed on certain data items of the lead records, such as by the syntax module 152 of FIGS. 2, 5A, and 5B. As shown in FIG. 13, each of the lead records 1210 satisfies the applied minimum data requirements. As noted above, the minimum data requirements may be provided by the client or may be default requirements. In one embodiment, if the minimum data requirements are not satisfied for a lead record, further enhancement processes, such as those illustrated in FIG. 13, are not applied to the data items of the lead.

In the embodiment of FIG. 13, a spoof word check is performed on certain data items of the lead records, such as by the spoof module 160 of FIGS. 2, 8A, and 8B. As shown in FIG. 13, a spoof check of the address data item of lead records 1210A has indicated that the address data item includes spoof words. Thus, in one embodiment the lead 1210A may not be processed by further enhancement processes, such as those illustrated in FIG. 13. In other embodiments, however, spoof words located in certain fields of a lead record, such as an address field, are noted to the client, but do not abort the enhancement processes. In other embodiments, only the first name and surname data items are compared to spoof words and, thus, spoof words in other fields, such as the address field, are not identified. In other embodiments, the spoof module 160 determines a confidence level indicative of a likelihood that a data item includes one or more spoof words. In this embodiment, if the confidence level is above a certain threshold, the enhancement processing may be aborted, while if the confidence level is below that threshold, the processing may continue, optionally reporting the located possible spoof word in the enhanced lead record.

A duplicate check may also be performed on the leads 1210A, 1210B. In an embodiment where leads 1210A, 1210B are received from different clients, the duplicate check preferences may be different. For example, one client may request that only full name and address fields are checked, while another client may request that ZIP code and telephone number are additionally checked in locating duplicates. Additionally, each client may have a different reporting period or, alternatively, may use a default reporting period. In the embodiment of FIG. 13, a duplicate check has been performed on each of the leads 1210A, 1210B, and the results of the duplicate check are illustrated. In one embodiment, the illustrated duplicate check results are includes in the enhanced lead record that is returned to the client. In one embodiment, if a duplicate lead is located within the reporting period, the remaining enhancement processes are aborted.

In one embodiment, each client may select whether an email validation should be performed and/or what specific validation techniques should be used. For example, an email address may be analyzed to determine if the syntax of the email address is proper, such as if the "." and the "@" symbol are in the proper order and appropriate characters are before, after, and/or between these symbols. In another embodiment, an email address may be validated to determine if the email address has been established on the domain provided in the email address. Additionally, email addresses in the lead records may be compared to addresses on spam lists and notifications of matches may be provided to the client.

In the embodiment of FIG. 13, an information append process, such as may be performed by the information append module 154 of FIGS. 2, 9A, and 9B, may be performed. In one embodiment, the appended information is included in an enhanced lead record that corresponds with the received lead record. As shown in FIG. 13, the information append module 154 has indicated that the phone number included in lead 1210A appears incorrect. This indication may be provided to the client if one or more of the data sources 120A, 120B (FIGS. 9A and 9B) indicate that an alternative telephone number is associated with the potential customer, for example. In one embodiment, an alternative telephone number is returned from one or more of the data sources 120A, 120B and is included in the enhanced lead record that is provided to the client. In one embodiment, information related to other data fields may be appended to leads, such as alternative names, addresses, and/or email addresses for the potential customer, for example.

In the embodiment of FIG. 13, exemplary contactability scores for each of the leads 1210 are illustrated. More particularly, lead 1210A has been given a contactability score of "B," while lead 1210B has been given a contactability score of "A." In one embodiment, the scoring module 156 of FIGS. 2, 10A, and 10B determines the contactability scores based at least partly on information received from one or more data sources in communication with the enhancement module 110. Applying the exemplary criteria of FIG. 11, the lead 1210B received an "A" score because at least one data source indicated that the full name and address of the lead 1210B correspond with the phone number of the lead 1210A in the one or more data source. Similarly, applying the exemplary criteria of FIG. 11, the lead 1210A received a "B" score because at least one data source indicated that the surname and address of the lead 1210A corresponds with the phone number of the lead 1210A in the at least one data source. In one embodiment, other criteria for assigning a contactability score to a lead may be used. In one embodiment, information from two or more sources may be received and used in determining a contactability score. For example, in one embodiment the contactability score of a lead may be equal to a highest of multiple contactability scores associated with information received from two or more data sources.

Stage II Lead Enhancement

In certain embodiments, the enhancement module 110 performs multiple stages of enhancing received lead records. The discussion above generally describes a first stage of lead enhancement that comprises one or more lead validation and verification processes, such as may be performed by the syntax module 152, information append module 154, scoring module 156, dupe-check module 158, and spoof module 160, for example. A second stage of lead enhancement, described in further detail below, may comprise one or more enhancement processes, such as those performed by information append module 154 and output bundling module 166, for example. In one embodiment, the stage II enhancements are performed on leads that have already been enhanced by one or more of the processes described above with reference to Stage I lead enhancements. In other embodiments, the Stage II enhancements described herein are performed on leads that have not previously been analyzed by the lead enhancement module 110 (FIG. 1) or are in the process of being analyzed by the lead enhancement module 110.

In one embodiment, the enhancement module 110 retrieves additional data related to received lead records. This additional data may be received from one or more data sources, such as data sources that are internal or external to the lead enhancement module 110. In one embodiment, certain of the additional data items comprise (1) additional information regarding the individual identified in a received lead record, (2) information regarding the household of which the individual is a member, (3) general information regarding individuals residing near a residence of the individual, and/or (4) information regarding individuals residing in one or more expanded geographical areas, such as within a common ZIP code. Additionally, certain of the additional data items may be based upon models using information in the lead record, information that has been appended to the lead record, and/or any other information regarding the individual that is received from a data source. In one embodiment, the additional data items associated with a lead record are included in the corresponding enhanced lead record or with the corresponding enhanced lead record. In other embodiments, certain of the additional data items are used in further analysis of the individual identified in the lead record, such as further statistical modeling as described below in the section regarding Stage III enhancements, for example.

In one embodiment, the particular additional data items that are provided to a client are selected from a bundled group of data items that are related to a vertical market of the client and/or data items that are selected by the client. For example, a default data bundle for a particular vertical market may be created such that additional data items that are appended to an enhanced lead record are relevant to the client's particular vertical market. In one embodiment, the output bundling module 166 determines a vertical market of a client and selects a default data bundle to deliver to the client. For example, a client in an educational market, such as a university, may have a default data bundle that includes additional data items that are helpful to the client in making admission and/or scholarship decisions. In one embodiment, the additional data items are retrieved from one or more data sources, such as data sources 120A, 120B, for example.

In one embodiment, clients may select from all available data assets, such as data that is available from data sources 120A, 120B, in order to select which additional data items the particular client would like returned to the client in the enhanced lead record. For example, a client may save a personalized data bundle including an indication of those additional data items that the client would like included in enhanced lead records that are prepared for the client. In one embodiment, the client may begin with a default data bundle for the client's vertical market, for example, and then modify the data items included in the default data bundle to create a personalized data bundle. In other embodiments, default data bundles that are based on criteria other than vertical markets of the clients may also be available to clients.

As noted above, in certain embodiments, data bundles comprise various levels of information regarding the individual associated with the lead record, such as information associated with the person, household, geographic location, and/or ZIP code location of the individual. More specifically, the additional data items in a personalized data bundle may be selected by a particular client and/or may include one or more default data bundles, such as a default data bundle for a particular vertical market.

Figure 14:
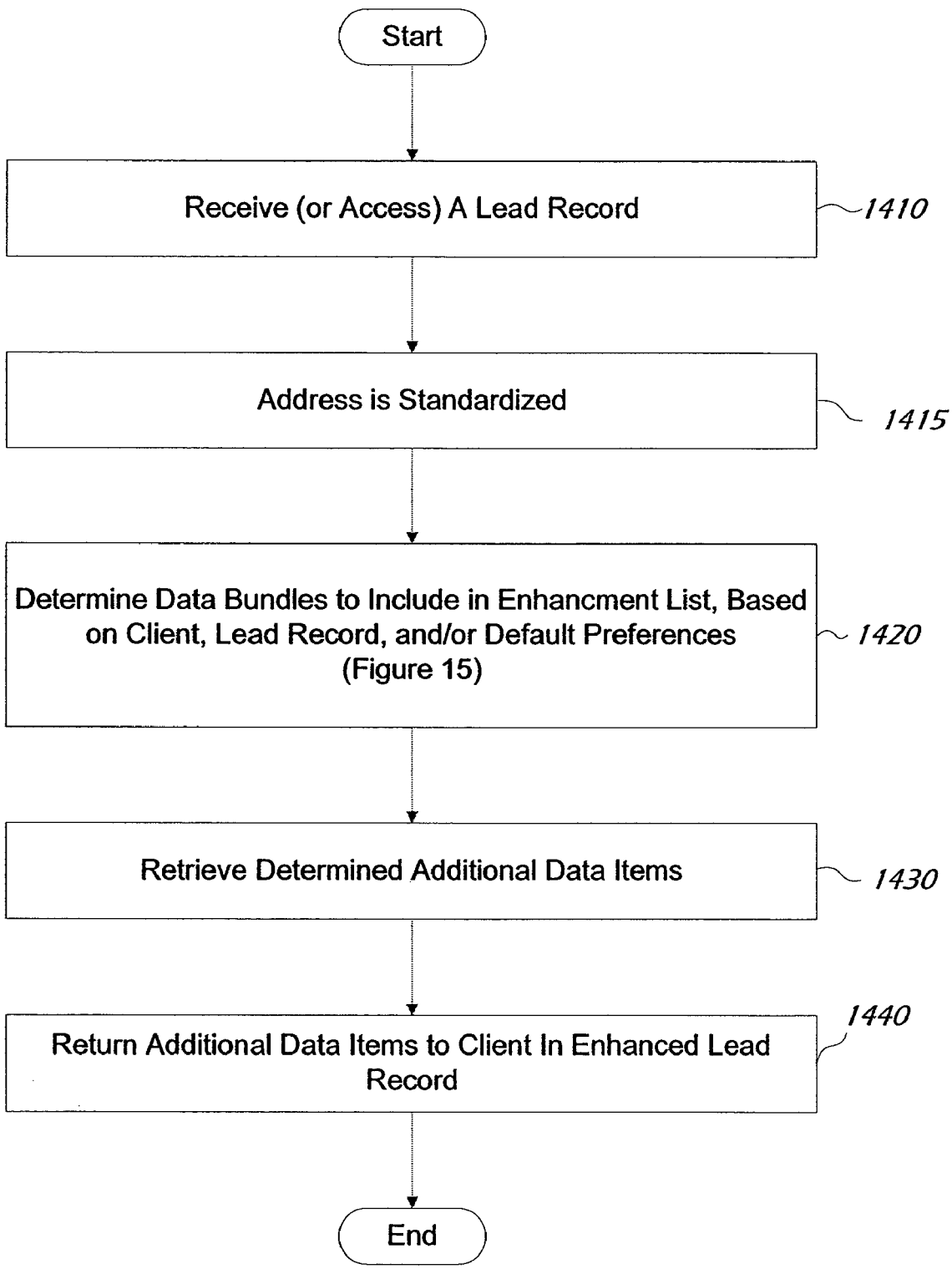
FIG. 14 is one embodiment a flowchart of a method of determining a group of additional data items to append to an enhanced lead record.

FIG. 14 is one embodiment a flowchart of a method of determining a data bundle of additional data items to append to an enhanced lead record. In one embodiment, at least some of the additional data items are returned to the client in the corresponding enhanced lead record. As noted above, in one embodiment the enhancement module 110 (FIG. 2) may be configured to retrieve additional data items indicated in a default data bundle comprising one or more additional data items and/or data items in one or more personalized data bundles, which are each described in further detail below. Depending on the embodiment, certain of the steps described in the example below may be removed, others may be added, and the sequence of the steps may be altered.

Beginning in a block 1410, the enhancement module 110, and more particularly, the information append module 154 and/or the output bundling module 166, accesses a lead record from a client. In one embodiment, the additional processing described in the method of FIG. 14 is performed on a selected group of lead records. In one embodiment, rules may be established by the enhancement module 110 and/or the client 130 indicating which lead records should have one or more data bundles appended to the enhanced lead records. For example, in one embodiment a contactability score of a received lead record must exceed a predetermined threshold in order for the lead record to be further processed by the method of FIG. 14, whereby additional data items may be appended to the enhanced lead record. In this embodiment, for those lead records having a contactability score below the threshold, further processing of the lead record is not performed. However, for those lead records having a contactability score above the threshold, additional information regarding the lead record may be obtained, such as by the process described with respect to FIG. 14. In other embodiments, other criteria of the lead record and/or results of other previous processing, such as the content of the syntax indicator 510 (FIG. 5B), the duplicate indicator 610 (FIG. 6B), the spoof check results 810 (FIG. 8b), or the contactability score 1010 (FIG. 10A), for example, may be used in order to determine if one or more data bundles should be acquired and appended to the corresponding lead record.

Next, in a block 1415, a physical address of the individual associated with the lead record, such as a residence or business address, is standardized. For example, abbreviations, ordering of street address components, city names, and ZIP codes may be adjusted to a standard form. In one embodiment, such an address standardization is performed by Stage I enhancements and, thus, may not need to be reproduced in block 1415. In one embodiment, standardization of the address increases an accuracy of data received from data sources because, with the address of a lead record standardized, the additional data items received by the enhancement module are more likely associated with the lead record.

Figure 15:
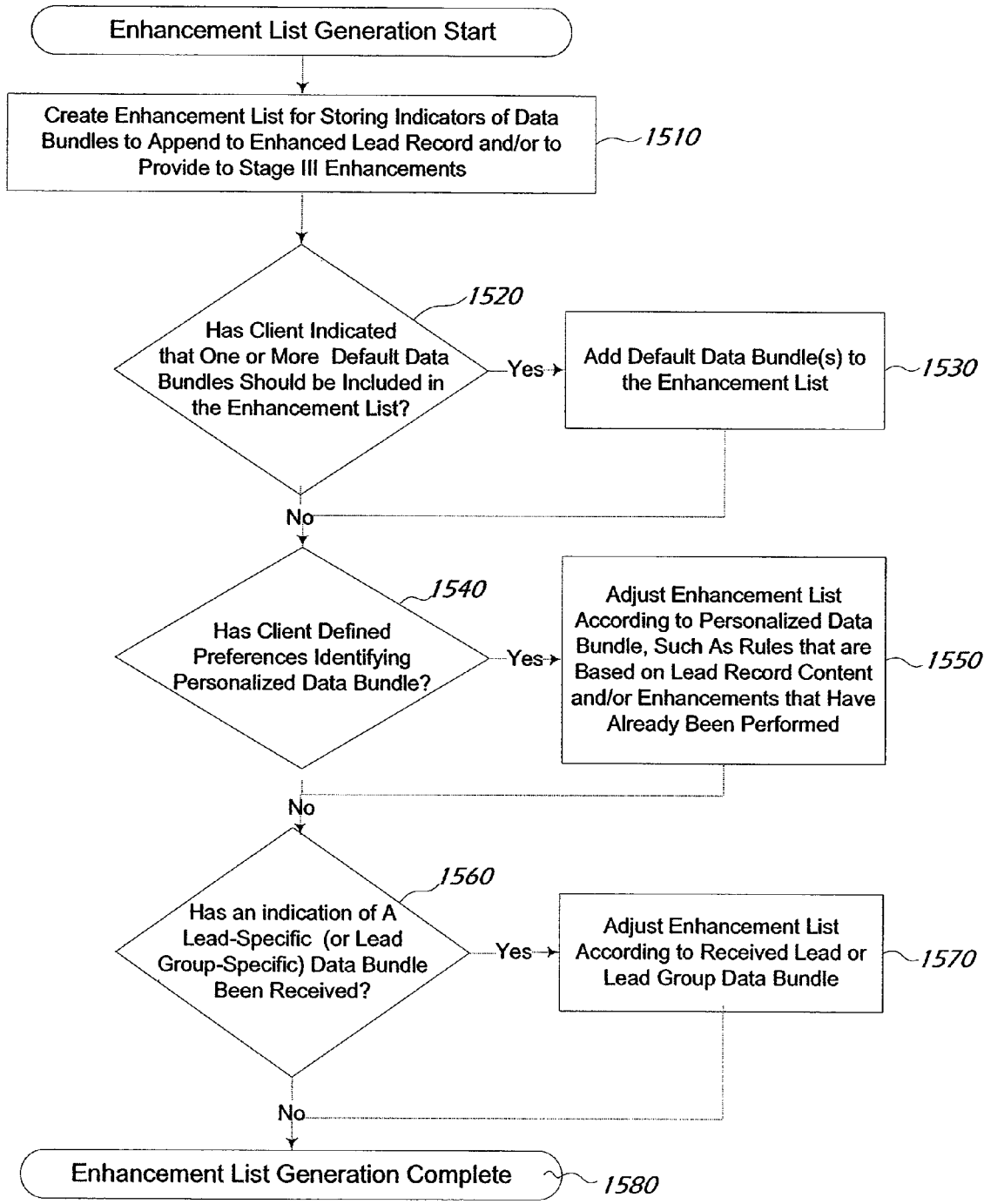
FIG. 15 illustrates one embodiment of a method of determining additional data items, such as those within default or personalized data bundles, to include in an enhancement list

Continuing to a block 1420, the lead enhancement module 110 determines one or more data bundles to be included in an enhancement list, wherein the enhancement list comprises one or more additional data items, to append to an enhanced lead record. In one embodiment, the data bundle(s) are determined based on client preferences, characteristics of a particular lead record, and/or characteristics of the client. FIG. 15, which is described in further detail below, illustrates one embodiment of a method of determining one or more data bundles to include on an enhancement list, where the data bundles indicated on the enhancement list are retrieved from one or more data sources.

Moving to a block 1430, the additional data items identified in the data bundles of the enhancement list are retrieved from one or more data sources. For example, in one embodiment the additional data items are retrieved from a database that is stored local to the enhancement module 110. In one embodiment, this local database may be periodically updated with information from one or more external data sources that receive frequent data updates. In other embodiments, an indication of the additional data items listed on the enhancement list is transmitted to one or more external data sources and information corresponding with the additional data items is returned to the enhancement module 110 by the one or more external data sources. For example, in one embodiment an external data source comprising one or more portions of Experian's Consumer Database, such as Experian's INSOURCE data store, is accessed in order to retrieve additional data items indicated in the enhancement list. In other embodiments, the external data source may comprise any other available source of data regarding potential customers, or other individuals or businesses.

Next, in a block 1440, certain of the additional data items that are returned from the one or more data source, are included in the enhanced lead record corresponding to the received lead record. In one embodiment, the data source returns information in excess of the requested additional data items. In this embodiment, the enhancement module 110 may be configured to either return all of the excess data items returned from the data source or, alternatively, the enhancement module 110 may extract only the requested additional data items from the received data for inclusion in the enhanced lead record. In one embodiment, the data source may not locate data associated with each of the requested additional data items. In this embodiment, the lead enhancement module 110 may send a subsequent request for the additional data items in the enhancement list to a secondary data source. In this embodiment, the lead enhancement module 110 may perform some comparison of the additional data items returned from the first and the secondary data sources in order to determine what additional data item should be returned to the client. In one embodiment, the additional data items from each of the data sources may be returned to the client. In other embodiments, the additional data items that are determined to be most relevant to the information requested by the client are returned in the enhanced lead record. In other embodiments, even further data sources may be accessed in order to receive further information regarding the requested additional data items and to potentially increase an accuracy and/or relevancy of the additional data items that are included in the enhanced lead record.

FIG. 15 illustrates one embodiment of a method of determining additional data items, such as those within default or personalized data bundles, to include on an enhancement list. Beginning in a block 1510, the lead enhancement module 110 creates an enhancement list for storing indicators related to data bundles and/or individual additional data items to be included in an enhanced lead record associated with a received lead record. In one embodiment, the enhancement list may be applied to multiple leads from a client, multiple clients, and/or groups of clients in a particular vertical market, for example. In one embodiment, the lead enhancement module 110 advantageously provides clients with the option of customizing which additional data items are included in each enhanced lead record or each group of enhanced lead records. In one embodiment, certain of the additional data items included on the enhancement list are not returned to the client, but are stored for use in one or more models that may be applied by the lead enhancement module 110 and/or an external computing device, such as in a model that is applied in Stage III lead enhancements described below.

Moving to a block 1520, the enhancement module 110 determines if the client has indicated that one or more default data bundle should be included in the enhancement list. In one embodiment, default data bundles are provided for particular vertical markets, such as an educational institution data bundle, and a retail telemarketing data bundle. Thus, in one embodiment the default data bundle indicated by the client may comprise additional data items that are relevant to a particular vertical market in which the client has an interest. In block 1520, if the lead enhancement module 1110 determines that the client has selected one or more default data bundles to include in the enhancement list, the method continues to a block 1530 where the one or more default data bundles are added to the enhancement list, and then to block 1540. Conversely, if the enhancement module determines that the client has not selected one or more default data bundles, the method continues to block 1540. In other embodiments, one or more default data bundles may be included in the enhancement list based upon other criteria, such as horizontal markets, contents of a lead record, and/or characteristics of a client.

Continuing to a block 1540, the enhancement module 110 determines if the client has defined preferences identifying personalized data bundles that should be included in the enhancement list. For example, a client may select one or more default data bundles (blocks 1520, 1530) and subsequently remove one or more of the additional data items included in the default group in order to generate a personalized data bundle. Likewise, a client may add additional data items to a default data bundle that has been selected. In one embodiment, the client may be presented with the available additional data items that can be appended to a lead record and provided with an opportunity to select additional data items to be added to the enhancement list. In one embodiment, once the client has selected the precise additional data items that the client wants included in the enhancement list, the personalized data bundle may be stored and later accessed by the lead enhancement module 110 when additional lead records are received from the particular client. In block 1540, if the client defines a personalized data bundle, the method continues to a block 1550, and then on to block 1560. Conversely, if the client has not defined a personalized data bundle, the method continues to block 1560.

In block 1550, the enhancement module 110 adjusts the enhancement list according to the personalized data bundle defined by the client, such as adding additional data items to the enhancement list or removing data items from the enhancement list. In one embodiment, the client may define rules that indicate which additional data items should be included on the enhancement list. For example, lead records exceeding a predetermined contactability score threshold may have a first group of additional data items included in the personalized data bundle, while those lead records that have contactability scores below the predetermined threshold may have a second group of additional data items included in the personalized data bundle. Similarly, those lead records that are determined to be duplicates or which are believed to include one or more spoof terms may comprise a different group of additional data items in a personalized data bundle than the lead records that are not indicated as containing duplicates or spoof terms. In another embodiment, the lead enhancement module 110 performs additional analysis of the received lead record in order to determine which additional data items should be included in the personalized data bundle. For example, additional data items in the personalized data bundle may be customized for lead records having residence ZIP codes within certain ranges or for lead records identifying individuals within certain age ranges.

In one embodiment, the output bundling module 166 of the lead enhancement module 110 determines a confidence level that an individual associated with a received lead record matches an individual in the one or more data sources that provide the additional data items to the enhancement module 110. In one embodiment, the determined confidence levels are associated with a set of data bundles and/or additional data items that are available for retrieval with respect to the lead record. For example, if the confidence level is very low, such as below 70%, for example, the enhancement module 110 may only request additional data items from the one or more data sources regarding the geographic region in which the individual associated with the lead resides. If the confidence level is very high, such as above 95%, for example, the enhancement module 110 may request any additional data items indicated in the enhancement list, including additional data items associated with the individual, such as, for example, gender, age, marital status, and an indicator of whether the individual is a business owner. In other embodiments, the additional data items that are available for a particular lead record are divided into multiple additional groups that are associated with various confidence levels.

In one embodiment, a client may indicate that one of a plurality of confidence level data bundles, which are each associated with respective ranges of confidence levels, is included in the enhancement list. In this embodiment, the additional data items for each lead record may vary according to determined confidence levels for respective lead records. For example, if a confidence level for a particular lead record is very high, a first data bundle may be included in the enhancement list. In one embodiment, the first data bundle comprises data items regarding, for example, the individual, the individual's household, the immediate geographic residence area of the individual, and the larger, ZIP+4 geographic residence area of the individual. In this embodiment, as the confidence level associated with lead records decreases, the quantity of additional data items in an associated confidence level data bundle also decreases. In this embodiment, the amount of non-relevant information regarding a lead record that is returned to a client may be reduced.

Moving to a block 1560, the enhancement module 110 determines if any indications regarding a data bundle that is specific to a lead or lead group have been received. In one embodiment, a client may include a lead specific data bundle that should be included in the enhancement list for a particular lead record or for a group of lead records. Accordingly, the client is given the flexibility to retrieve specific customized information for each lead record, if desired. Similarly, the client may indicate a lead group data bundle that should be determined for each lead record in a batch of lead records that are transmitted to the enhancement module 110. In one embodiment, the lead or lead group data bundle is transmitted from the client along with the lead record(s) to which the data bundle is to be applied. For example, a lead specific data bundle that is only to be applied to a specific lead record may be included in header information transmitted with the lead record. In other embodiments, lead or lead group specific data bundles may be transmitted to the enhancement module 110 in other manners, such as using an Internet accessible user interface or a stand-alone user interface that allows the client to select additional data items to be retrieved.

In block 1560, if the enhancement module 110 determines that no indications regarding lead or lead group data bundles have been received, the method continues to a block 1580 whether the enhancement list generation is complete. In one embodiment, after completion of the enhancement list, the enhancement module 110 retrieves the additional data items indicated on the enhancement list from one or more data sources, such as by the process described with respect to FIG. 14, for example.

In block 1560, if the enhancement module determines that indications regarding lead or lead group data bundles have been received, the method continues to a block 1570 where the enhancement list is adjusted according to the received indications. In one embodiment, the client may indicate whether a lead or lead group specific data bundle should be used instead of the default and/or personalized data bundles or in addition to the default and/or personalized data bundles. In an embodiment where the lead specific data bundle replaces any existing default or personalized data bundles for a client, even though the client has selected a default data bundle (1520, 1530) and a personalized data bundle (1540, 1550), the lead specific data bundle will be the only data bundle included on the enhancement list for the particular lead or lead group. In one embodiment, if a lead record is associated with a lead or lead group specific data bundle, the method of FIG. 15 is bypassed and the additional data items in the lead specific data bundle are requested from the appropriate data sources.

As noted above, once the enhancement list comprises each of the data bundles and/or individual additional data items that should be obtained with regard to a specific lead record, the output bundling module 166 of the enhancement module 110 may request the additional data items from one or more data sources, as described above with reference to FIG. 14, for example. In some embodiments, the process of FIG. 15 may be performed only once by a client in order to determine a personalized data bundle, which may comprise one or more data bundles that may have been modified, and that personalized data bundle may be automatically selected for inclusion on the enhancement list for lead records received from the particular client.

FIG. 16 illustrates one embodiment of three exemplary data bundles that may be included in an enhancement list, or that may be separated included on different enhancement lists. The exemplary default bundle 1610 comprises a list of additional data items that may be interesting to a particular client, such as a default bundle associated with a particular vertical or horizontal business market. The personalized data bundle 1620 comprises additional data items that are customized by the client. Exemplary data bundle 1620 was created starting with the default bundle 1610, which was modified to remove certain of the additional data items that were not desired by the client. The additional data items that were removed from the default bundle 1610 are shown in strikethrough text in FIG. 16. In one embodiment, the enhancement provider charges a fee to the client per additional data items that is returned in an enhanced lead record. Thus, if the value to the client of certain additional data items is low, the client may personalize the data bundle to include only those most highly valued data items. In other embodiments, the enhancement provider charges a flat fee for default bundles, such as the default data bundle 1610. In other embodiments, the enhancement provider charges a fee based upon the data source from which the data is received. The personalized data bundle 1630 comprises additional data items that may be selected by a client from a list of available data items.

In one embodiment, an enhancement list for a client comprise the sample default data bundle 1610, the personalized data bundle 1620, or the personalize data bundle 1630. In other embodiments, the personalized data bundle 1630 may be combined with either of the default data bundle 1610 or the personalized data bundle 1620 in the enhancement list. In any case, once a client has determined an appropriate data bundle, or set of data bundles, to include on their respective enhancement list, that enhancement list may be stored and accessed by the output bundling module 166 each time lead records are received from the particular client. In one embodiment, the enhancement list for a client may be used for only those lead records that meet certain criteria. In another embodiment, a client may have multiple enhancement lists that are used for lead records with different attributes. For example, a first enhancement list may be used for lead records identifying an individual having a residence address in the western U.S., while a second enhancement list may be used for lead records identifying an individual having a residence address in the eastern U.S. Similarly, different enhancement lists may be used for leads based on one or more of an annual income level, gender, age, spending tendencies, or other attributes of an individual, for example.

In one embodiment, the output bundling module 166 generates and/or modifies an enhancement list based on attributes of lead records and business rules that may be received from the client. For example, a client may indicate that lead records originating from a particular lead source should be enhanced with a modified version of a default enhancement list for the client. Thus, the output bundling module may apply rules to the lead record data items, or other attributes of the lead records, in order to determine which data bundle(s) and/or modifications to data bundle(s) should be made for a particular lead record or group of lead records. In one embodiment, the bundling module 166 applies a default set of rules to the lead records prior to requesting the additional data items indicated on the relevant enhancement list(s). For example, a default rule set may indicate that a minimal enhancement list should be used for those lead records that are likely duplicates of other lead records received from the same client. In other embodiments, the rules may be defined by the client, such as rules that associate different data bundles with lead records having different attributes, such as a first data bundle for lead records indicating a residence in a first geographic area and a second data bundle for lead records indicating a residence is a second geographic area. Other attributes that may be used by the default and/or client rules include, but are not limited to: lead source, such as call center, website, or lead aggregator; gender; age; indicator of whether lead has opted-in for certain credit checks; permissible use indicators; and in-market data, such as indicators as to whether a lead is in the market for a particular service or product.

In one embodiment, certain rules may be at least partly based on additional data items that are returned from a data source, such as additional data items that are retrieved in block 1430 of FIG. 14. In this embodiment, the rules may initiate generation and/or selection of another data bundle of additional data items to be retrieved from one or more data sources based upon the rules and the already received additional data items. For example, if the initial enhancement list includes a request for an indicator of whether the individual associated with the lead record has an interest in sporting equipment, business rules applied by the output bundling module 166 may request further additional data items from one or more lead sources, such as in a supplemental enhancement list, related to specific sporting activities performed by the individual or particular sporting good retailers from which the individual has made purchases. In this way, the enhancement module 110 may perform multiple rounds of retrieving and analyzing additional data items in order to provide focused and specific information regarding lead records.

As noted above, certain of the additional data items in the data bundles 1610, 1620, 1630 may not be returned to the client due to a low confidence level regarding a match between the information in the lead record, or information appended to the lead record in Stage I processing, and identifying information available in the data sources.

Although the enhancement processes described herein are described in three stages that may operate together, such as sequentially and/or concurrently, it is contemplated that each of the stages may operate independent of the other stages. For example, in one embodiment the lead enhancement processes of Stage II may be executed on a received lead record, without first processing the lead record with the methods described above with reference to Stage I, such as may occur if a particular client opts out of stage I processing and subscribes only to Stage II and possibly Stage III processing.

Stage III Lead Enhancement

A third stage of lead enhancement may comprise custom enhancements for lead records, such as application of custom models to lead records that may be performed by the custom model module 164. For example, a particular client may desire a lead score that is based on one or more statistical models that are not available solely from the data sources that are accessed by the enhancement module. Thus, a model that is customized for a particular client, or group of clients, may be developed based on the criteria and desired scoring output requested by the client. The customized models may use data items included in the lead record and/or data retrieved from a data source, such as the additional information that may be retrieved in stage II. This customized model may then be applied to lead records received from the client, with the results of the customized model(s) appended to an enhanced lead record that is returned to the client.

In one embodiment, the custom model module 164 uses data items included in the received lead record and/or additional data items received from one or more of the data sources in generating a score for a received lead. In one embodiment, the scores generated by the custom model module 164 are propensity scores that indicate a likelihood of an individual to perform a certain action, such as request or buy certain goods or services. For example, a custom model for a particular client may consider an age and gender of an individual, as provided in a received lead record, as well as a one or more additional data items received from one or more of the data sources (such as those exemplary additional data items in the default bundle 1610 (FIG. 16)) in generating a propensity score that is of interest to the client.

In one embodiment, the custom model module 164 also accesses additional data provided by the requesting entity, or other source, in evaluating a custom model for a particular client. For example, data regarding currently available inventory of the client, or entity associated with the client, may be used by the custom model module 164 in determining an individual's propensity to make a purchase from the client's inventory in the near term. Thus, the custom model module 164 may receive and/or access information that is not specifically associated with the individual associated with a current lead record in evaluating a custom model.

As noted above, in one embodiment the output of the custom model module 164 is a propensity score that is indicative of an individual's propensity to perform a certain action, such as to request a certain product or service. For example, an automobile dealer may desire that a custom model outputs a propensity score that is indicative of an individual's propensity to purchase particular makes and models of automobiles. Likewise, an educational institution, such as a college, may desire that a custom model outputs a propensity score that is indicative of an individual's propensity to enroll at the college. These custom models, and any others that are desired by a client, may be developed by the enhancement provider using requirements data provided by the client, such that the custom model is available for evaluation with respect to lead records that are received from the particular client. Thus, in response to transmitting one or more lead records to the enhancement module 110, a client may receive a propensity score for each lead record that is helpful to the particular client in making marketing, budget, and/or other business decisions.

In one embodiment, a custom model is associated with a particular client. In other embodiments, custom models may be developed for specific business markets, such as vertical or horizontal business markets, and made available to clients in the respective business markets, for example. In one embodiment, multiple custom models may be available to each client and the client may select one or more of the available models to apply to transmitted lead records. In another embodiment, the enhancement module 110 selects one or more of the custom models to apply to lead records based on business rules that have been developed by the client, for example. Thus, a client may establish a rule that applies a first custom model on lead records meeting a first criteria and applies a second custom model on lead records meeting a second criteria. The business rules may be based upon any combination of available data, such as data items of the lead record, additional data generated by the enhancement module 110, items retrieved from the data sources, and other data associated with the client.

Below is an example of the processing that may be performed in a third stage of lead enhancement. Depending on the embodiment, certain of the steps described in the example below may be removed, others may be added, and the sequence of the steps may be altered.

Example Embodiment of Stage III Lead Enhancement

1. Client expresses their market modeling requirements to a modeling consultant. The modeling consultant works with the client to define the logic for the customized model and to understand the client's available data assets.
2. The logical model and requested data assets are described in plain English in a business requirements document and delivered to the client.
3. The client confirms and signs-offs on the model.
4. The client makes the requested data assets available to the enhancement module.

5. The customized model is generated, such as by using model generating software, for example KXEN.
6. The customized model is converted, if necessary, to be usable by the enhancement module.
7. The customized model is applied to lead records received from the client and a score associated with the customized model is returned to the client in an enhanced lead record.

Although the enhancement processes described herein are described in three stages that may operate together, such as sequentially and/or concurrently, it is contemplated that each of the stages may operate independent of the other stages. For example, in one embodiment the lead enhancement processes of Stage III may be executed on a received lead record, without first processing the lead record with the methods described above with reference to Stage I or Stage II.

As noted above, the described enhancement processes (Stage I, Stage II, and/or Stage III enhancements) may be performed on individual lead records received from a client and/or on batches of lead records that are received from the client. In one embodiment, all three stages of lead enhancement may be performed on a received lead record in real-time, such that an enhanced lead record is provided to the client 130 substantially immediately after the lead record is received by the enhancement module 110. In various embodiments, real-time generation of enhanced lead records may be performed in less than about 4 seconds. In other embodiments, real-time generation of enhanced lead records may be performed in slightly less or greater time, such as less than about 2 seconds, 5 seconds, 10 seconds, 20 seconds, or 30 seconds, for example. In one embodiment, the client 130 indicates whether transmitted lead records should be processed in real-time or in a batch manner, wherein batch processing may result in enhanced lead records being transmitted to the client within a matter of hours rather than seconds. In one embodiment, a batch of lead records marked for real-time processing may result in the lead enhancement module 110 transmitting a stream of enhanced lead records to the client as the lead records in the batch are processed and the enhanced lead records are generated.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method of enhancing a lead record received from a business entity computing device, the method comprising:
   entering into a lead record enhancement arrangement with a plurality of business entities, each business entity having a business entity computing device, the plurality of business entities representing a plurality of vertical business market segments;
   receiving in a first computing device a lead record from at least one of the plurality of business entity computing devices, at least one lead record comprising information regarding an individual, the business entity having an interest in the individual as a potential customer or client of the business entity, and the lead record information configured to assist the business entity in entering into a business transaction with the individual,
   the first computing device comprising a third party computing device independent of the at least one business entity computing device;
   providing at least one second computing device in communication with the first computing device but not in communication with the at least one business entity computing device, the second computing device comprising a third party computing device independent of the business entity computing device;
   determining the vertical business market segment associated with the business entity;
   storing the at least one lead record on one or more storage devices associated with the first computing device;
   providing a computer readable default data bundle associated with the at least one lead record based at least partly on the determined vertical business market segment of the business entity, the default data bundle indicating one or more additional data items associated with the at least one lead record that are to be retrieved from the second computing device,
   wherein the additional data items are not included in the at least one lead record;
   modifying the default data bundle by adding one or more indicators of data items to the default data bundle,
   wherein at least one of the indicators of data items is added to the default data bundle based on a geographic residence location indicated in the received lead record;
   generating at the request of the business entity in the first computing device a computer readable customized data bundle based at least in part on the determined vertical business market segment of the business entity;
   transmitting at least a portion of the default data bundle or the customized data bundle to the second computing device;
   receiving from the second computing device at least some of the additional data items indicated in the default data bundle or the customized data bundle;
   storing the received additional data items on the one or more storage devices;
   generating an enhanced lead record comprising at least a portion of the at least one lead record received from the business entity computing device and at least a portion of the additional data items received from the second computing device; and
   transmitting the enhanced lead record to the business entity computing device.

2. The method of claim 1, further comprising:
   generating a computer readable personalized data bundle to be associated with the at least one lead record, the personalized data bundle comprising indicators of one or more additional data items to be requested from the second computing device, the indicators being selected by the business entity;
   transmitting the personalized data bundle to the second computing device;
   receiving from the second computing device at least some of the additional data items indicated in the personalized data bundle.

3. The method of claim 2, wherein the personalized data bundle comprises indicators associated with additional data items that are not included in the default data bundle.

4. The method of claim 1, wherein one or more indicators of data items are added to the default data bundle based on one or more of a source of the lead record, in-the-market data associated with the lead record, a gender of the individual associated with the lead record, and an age of the individual associated with the lead record.

5. A computerized method of enhancing a lead record received from a client computing device, the method comprising:
 entering into a lead record enhancement arrangement with a plurality of business entities, each business entity having a business entity computing device, the plurality of business entities representing a plurality of vertical business market segments;
 receiving in a first computing device a lead record comprising information regarding an individual,
 wherein the lead record is received from a business entity computing device associated with a business entity, the business entity having an interest in entering into a business transaction with the individual, and the lead record information is configured to assist the business entity in entering into the business transaction with the individual, and
 wherein the first computing device comprises a third party computing device independent of the business entity computing device;
 providing one or more data source computing devices in communication with the first computing device but not in communication with the business entity computing device,
 wherein the one or more data source computing devices are independent of the business entity computing device;
 determining the vertical business market segment associated with the business entity;
 generating a computer readable default enhancement list based at least partly on one or more attributes associated with the lead record or the determined vertical business market segment of the business entity, the default enhancement list comprising one or more additional data item indicators that are to be retrieved from the one or more data source computing devices, the default enhancement list being configured for transmission to the one or more data source computing devices;
 modifying the default enhancement list by adding one or more additional data item indicators to the default enhancement list, wherein at least one of the additional data item indicators is added to the default enhancement list based on a geographic residence location indicated in the received lead record;
 generating at the request of the business entity a computer readable customized enhancement list based at least in part on the determined vertical business market segment of the business entity;
 transmitting the default enhancement list or the customized enhancement list to the one or more data source computing devices;
 receiving from the one or more data source computing devices respective of the additional data items corresponding to the one or more additional data item indicators in the default enhancement list or the customized enhancement list;
 storing the additional data items on one or more storage devices; and
 transmitting at least a portion of the received additional data items to the business entity computing device.

6. The method of claim 5, wherein the attributes comprise one or more of: identification of the business entity associated with the business entity computing device, content of one or more data fields of the lead record, and information included in a header of the lead record.

7. The method of claim 5, wherein the attributes comprise a client identifier indicating the business entity associated with the business entity computing device from which the lead record was received such that the additional data items included on the customized enhancement list are associated with the business entity associated with the business entity computing device.

8. The method of claim 5, wherein the attributes comprise one or more of: a contactability score of the lead record; a geographic residence location indicated in the received lead record, a source of the lead record, in-the-market data associated with the lead record, a gender of an individual associated with the lead record, and an age of the individual associated with the lead record.

9. A computerized system for retrieving additional data items related to a received lead record in order to generate an enhanced lead record that is returned to a requesting entity, the system comprising:
 a data source computing device comprising one or more additional data items associated with each of a plurality of individuals, the data source computing device in data communication with a network,
 wherein the data source computing device in data communication with a lead enhancing computing device but not in communication with a business entity computing device, the data source computing device comprising a third party computing device independent of the business entity computing device;
 the lead enhancing computing device comprising:
  a processing unit,
  a storage device,
  an input/output interface in data communication with the network and configured to receive a lead record from the business entity computing device associated with a business entity,
  wherein the business entity represents a vertical business market segment, the business entity computing device is independent of the lead enhancing computing device and the data source computing device,
  wherein the business entity has an interest in an individual as a potential customer or client of the business entity, and the lead record comprises information configured to assist the business entity to enter into a business relationship with the individual indicated in the lead record, and
  an output bundling module configured to:
   provide a default data bundle indicating one or more additional data items to be requested from the data source computing device,
   modify the default data bundle based at least partly on one or more attributes associated with the lead record, the attributes comprising at least a vertical business market of the business entity and a geographic residence location indicated in the lead record,
   generate a customized data bundle based at least in part on the vertical business market segment of the business entity, and
   transmit the default data bundle or the customized data bundle to the data source computing device via the input/output interface,
   the output bundling module further configured to receive one or more of the additional data items from the data source computing device and to generate an enhanced lead record comprising at least some of the additional data items and at least a portion of the lead record received from the business entity computing device.

10. The computerized system of claim 9, wherein the network comprises the Internet.

11. The computerized system of claim 9, wherein indicators of the one or more additional data items are included in a data bundle.

12. The computerized system of claim 9, wherein indicators of the one or more additional data items are included in a data bundle that is customized by the business entity.

13. The computerized system of claim 9, wherein at least some of the additional data items to be requested from the data source computing device are determined according to rules that are based at least partly upon an attribute of the received lead record.

14. The computerized system of claim 9, wherein the attributes of the received lead record farther comprises one or more of: a contactability score of the lead record, a source of the lead record, in-the-market data associated with the lead record, a gender of an individual associated with the lead record, and an age of the individual associated with the lead record.

15. The computerized system of claim 9, wherein the output bundling module is configured to receive inputs from the business entity computing device indicating additional data items to be requested from the data source computing device.

16. The computerized system of claim 9, wherein indicators of the additional data items to be requested from the data source computing device are included in a client data bundle that is selected by the output bundling module for all lead records received from the business entity.

17. The computerized system of claim 9, wherein the additional data items requested from the data source computing device comprise a customized data bundle that is selected by the output bundling module only for a current lead record.

18. The computerized system of claim 17, wherein the customized data bundle is received by the lead enhancing computing device with the lead record.

* * * * *